(12) United States Patent
Penk et al.

(10) Patent No.: US 7,720,987 B2
(45) Date of Patent: May 18, 2010

(54) MAPPING TRANSPORT STREAMS

(75) Inventors: Mark D. Penk, Dacula, GA (US); Randolph R. Beebe, Duluth, GA (US)

(73) Assignee: Scientific-Atlanta, LLC, Lawrenceville, GA (US)

(*) Notice: Subject to any disclaimer, the term of this patent is extended or adjusted under 35 U.S.C. 154(b) by 152 days.

(21) Appl. No.: 12/179,746

(22) Filed: Jul. 25, 2008

(65) Prior Publication Data

US 2008/0282306 A1    Nov. 13, 2008

Related U.S. Application Data

(63) Continuation of application No. 09/976,604, filed on Oct. 12, 2001, now Pat. No. 7,457,883.

(51) Int. Cl.
*G06F 15/16* (2006.01)
*H04N 7/173* (2006.01)

(52) U.S. Cl. ...................... 709/231; 725/118

(58) Field of Classification Search ............ None
See application file for complete search history.

(56) References Cited

U.S. PATENT DOCUMENTS

| | | | |
|---|---|---|---|
| 5,592,476 A * | 1/1997 | Calamvokis et al. | 370/390 |
| 5,892,535 A | 4/1999 | Allen et al. | |
| 5,898,686 A | 4/1999 | Virgile | |
| 5,943,605 A * | 8/1999 | Koepele, Jr. | 725/114 |
| 5,996,021 A | 11/1999 | Civanlar et al. | |
| 6,002,687 A * | 12/1999 | Magee et al. | 370/394 |
| 6,047,323 A | 4/2000 | Krause | |
| 6,055,561 A * | 4/2000 | Feldman et al. | 709/200 |
| 6,134,554 A * | 10/2000 | Freimann et al. | 707/100 |
| 6,208,623 B1 | 3/2001 | Rochberger et al. | |
| 6,215,530 B1 | 4/2001 | Wasilewski | |
| 6,292,836 B1 * | 9/2001 | Teraoka | 709/236 |
| 6,360,299 B1 | 3/2002 | Arimilli et al. | |
| 6,377,993 B1 | 4/2002 | Brandt et al. | |
| 6,421,359 B1 * | 7/2002 | Bennett et al. | 370/538 |
| 6,470,389 B1 | 10/2002 | Chung et al. | |
| 6,490,627 B1 | 12/2002 | Kalra et al. | |
| 6,502,243 B1 | 12/2002 | Thomas | |
| 6,556,574 B1 | 4/2003 | Pearce et al. | |
| 6,570,875 B1 | 5/2003 | Hegde | |
| 6,628,301 B1 * | 9/2003 | Acton et al. | 715/716 |
| 6,643,298 B1 * | 11/2003 | Brunheroto et al. | 370/537 |
| 6,760,775 B1 | 7/2004 | Anerousis et al. | |
| 6,765,896 B1 | 7/2004 | Ahmed et al. | |
| 6,772,219 B1 | 8/2004 | Shobatake | |
| 6,789,118 B1 | 9/2004 | Rao | |

(Continued)

*Primary Examiner*—David E England
(74) *Attorney, Agent, or Firm*—Merchant & Gould

(57) ABSTRACT

In a digital network that includes a plurality of devices, which include multiple devices that transmit transport streams, a system and method are provided for discovering and mapping the transport streams and the plurality of devices included in the digital network. One such method sends a transport stream map request to a plurality of network devices. The network devices include a plurality of network transport stream sources and a plurality of network transport stream handlers. The method receives a plurality of replies to the transport stream map request. Each reply includes information associated with the respective network device. The method generates a transport stream map based on the received replies. The transport stream map represents a flow of transport streams among the plurality of network devices.

20 Claims, 12 Drawing Sheets

U.S. PATENT DOCUMENTS

| | | | |
|---|---|---|---|
| 6,826,613 | B1 | 11/2004 | Wang et al. |
| 6,829,238 | B2 | 12/2004 | Tokuyo et al. |
| 7,150,029 | B1 | 12/2006 | Ebling et al. |
| 7,457,883 | B2 * | 11/2008 | Penk et al. ................ 709/231 |
| 7,496,092 | B2 * | 2/2009 | Wilson ..................... 370/389 |
| 7,523,203 | B1 * | 4/2009 | Nguyen et al. ............ 709/226 |
| 2002/0059619 | A1 | 5/2002 | Lebar |
| 2002/0064189 | A1 * | 5/2002 | Coupe et al. .............. 370/537 |
| 2003/0002577 | A1 | 1/2003 | Pinder |
| 2003/0022643 | A1 * | 1/2003 | Djupsjobacka et al. ... 455/158.1 |
| 2003/0074441 | A1 | 4/2003 | Penk et al. |
| 2003/0074670 | A1 | 4/2003 | Penk et al. |
| 2005/0105486 | A1 * | 5/2005 | Robinett et al. ........... 370/321 |
| 2006/0136976 | A1 * | 6/2006 | Coupe et al. .............. 725/131 |

* cited by examiner

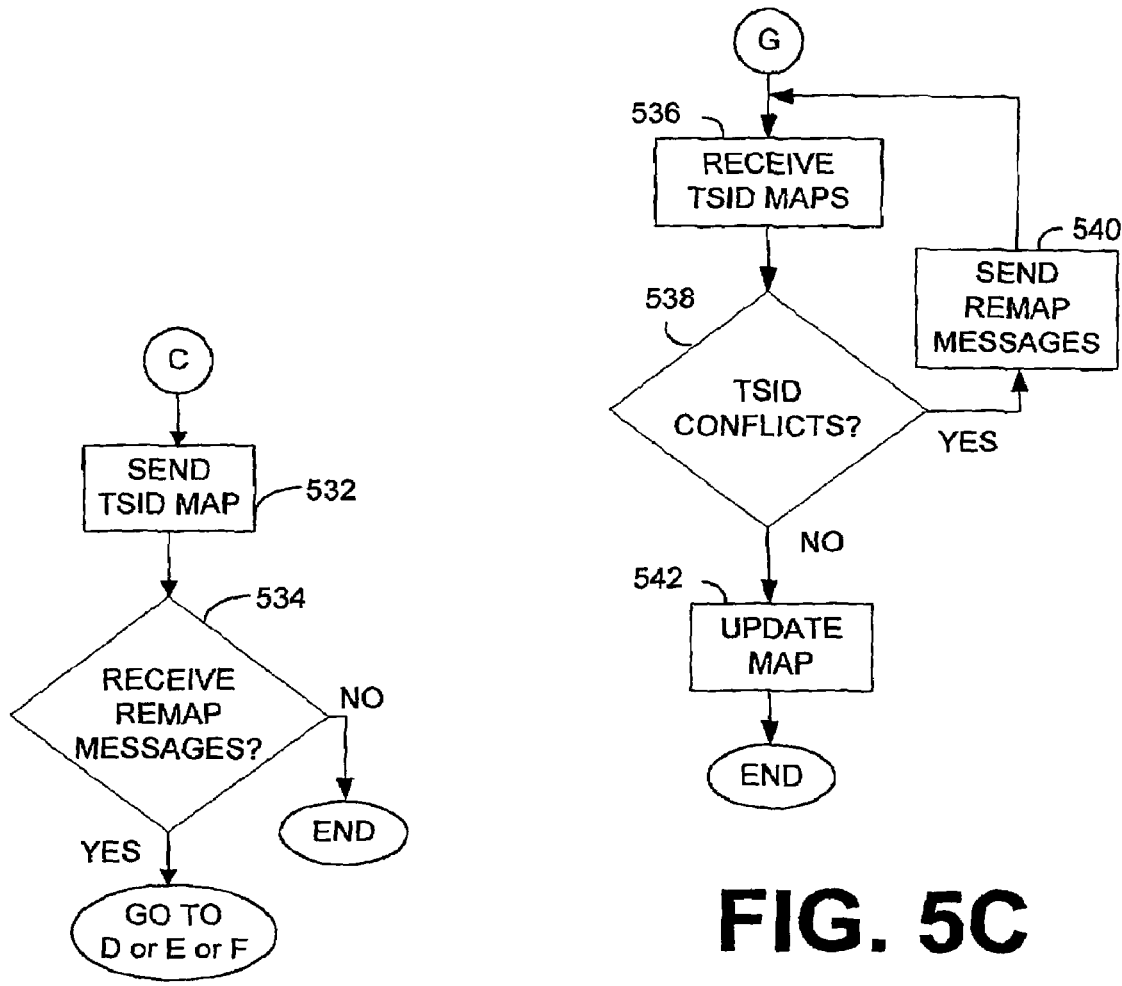
FIG. 5B
FIG. 5C
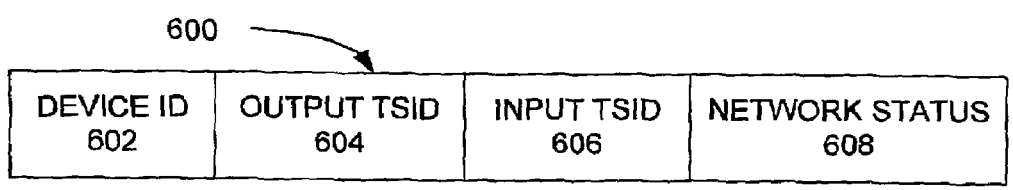
FIG. 6

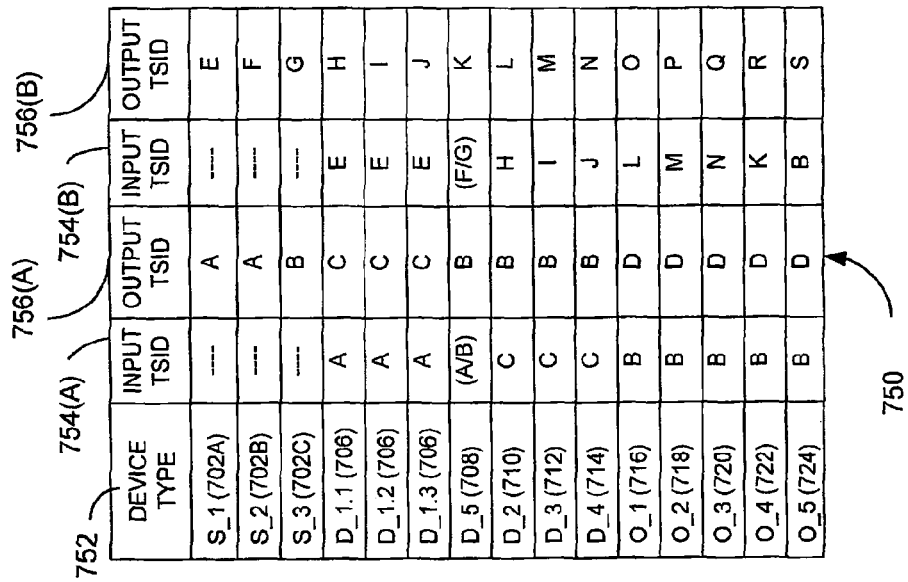
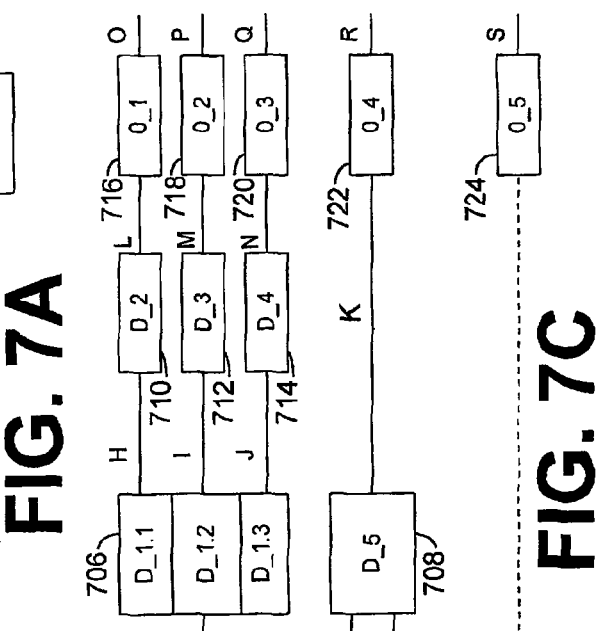
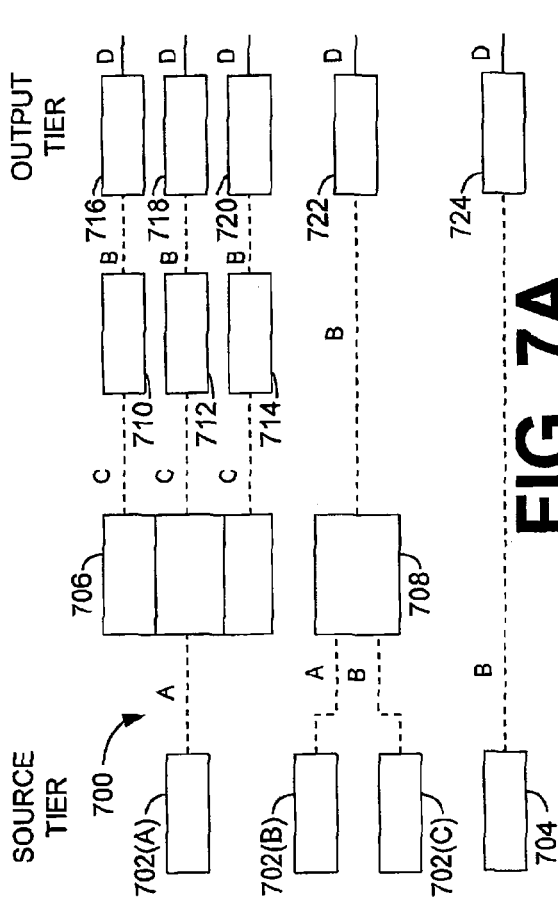
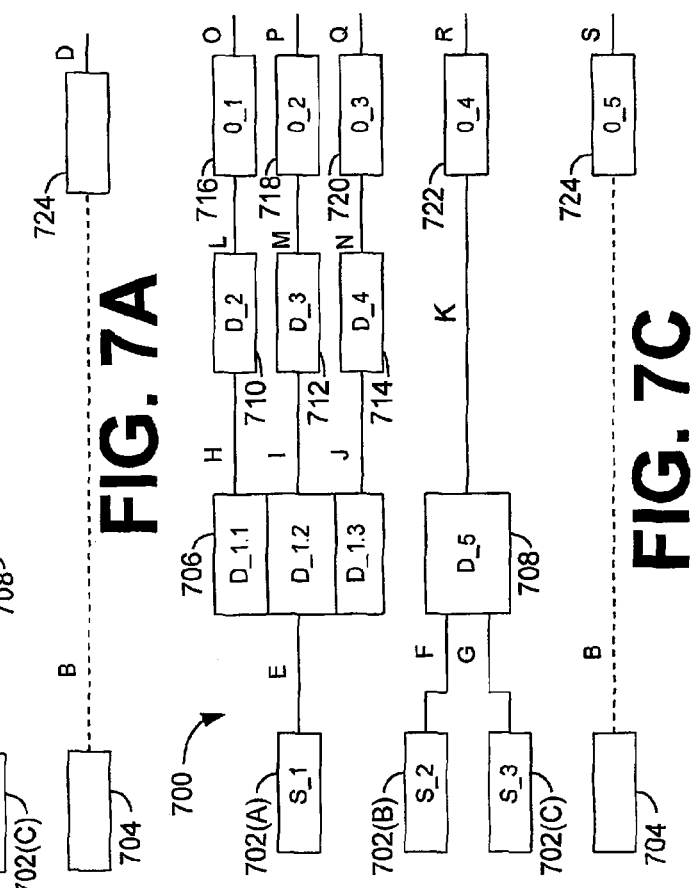

MAPPING TRANSPORT STREAMS

CROSS-REFERENCE TO RELATED APPLICATION

This application is a continuation of copending U.S. utility application entitled, "Mechanism for Implementing Network Discovery in a Cable Network", having Ser. No. 09/976,604, filed Oct. 12, 2001.

FIELD OF THE INVENTION

This invention relates generally to broadband communications systems, such as digital subscriber television systems and the equipment of the digital headend and hubs within such systems, and more specifically to discovering devices within the broadband communication system.

BACKGROUND OF THE INVENTION

Frequently, broadband systems transmit television signals to subscribers of a conditional access system. Broadband systems, such as cable and satellite television systems, typically include a headend for receiving programming and/or data from various sources and redistributing the programming and other data through a distribution system to subscribers. The headend receives programming signals from a variety of sources, combines the programming signals from the various sources, and transmits the combined signals through the distribution system to subscriber equipment. The distribution system can include a variety of media, such as coaxial cable, fiber optic cable, and satellite links, as well as a network of distributed nodes that then transmit the programming to subscriber locations, or to a network of distributed hubs, which transmit the signals to subscriber equipment, or any combination thereof. In a cable television system, the subscriber equipment can include a cable-ready television, a cable-ready video cassette recorder (VCR), or a digital home communications terminal (DHCT) that is connected to a television, computer, or other display device.

Increasingly, the headend is receiving and transmitting programming in a digital format, for example, Moving Pictures Expert Group (MPEG) format, instead of an analog format. Transmitting programs in MPEG format is advantageous because multiple digitized programs can be combined and transmitted in, for example, 6 MHz of bandwidth, which is the same amount of bandwidth required to transmit a single analog channel or program.

MPEG transport streams include overhead information such as MPEG tables that indicate the types and location of the programming within the transport stream. In a local television system, the MPEG tables include information that is specific to that local distribution system and its particular channel line-up. MPEG as referenced in this application is described in the MPEG-1 and MPEG-2 standards. The MPEG-1 standards (ISO/IEC 11172) and the MPEG-2 standards (ISO/IEC 13818) are described in detail in the International Organization for Standardization document ISO/IEC JTC1/SC29/WG11N (June 1996 for MPEG-1 and July 1996 for MPEG-2), which is hereby incorporated by reference. Therefore, the headend system, and the modulators in particular, must add the required MPEG table data to the outgoing bit stream.

MPEG transport streams are made up of standardized packets, each of which are 188 bytes in size. Each of the packets includes a header and a payload. Generally, the header is 4 bytes in size and the payload is 184 bytes in size, but the header can be expanded, in which case the payload is contracted by a corresponding amount. The header includes a packet identifier (PID), which is a 13-bit field that is used to identify the packet. Thus, 8,192 possible PID values can be assigned to packets in a transport stream. Certain PID values are reserved, such as PID=0 and PID=8,191, which are used to identify Program Association Tables (PAT) and stuffing packets, respectively, and will be described in greater detail hereinbelow.

Generally, a transport stream includes a plurality of elementary streams, and each elementary stream is made up of packets that have a common PID value. Within a transport stream, each elementary stream is associated a PID value, such that no two elementary streams are associated with the same PID value.

An MPEG program is made up of a plurality of elementary streams. Generally, an MPEG program includes a video elementary stream, which is made up of packets having digitized video information included therein, and at least one audio elementary stream.

Generally, a transport stream includes a plurality of programs, each of which are uniquely identified by a program number. The transport stream includes a program association table (PAT) packet, which has the PID value of 0. The PAT of a transport stream maps program identities to their program number. A program corresponds to what has traditionally been called a television channel, e.g., PBS, ESPN, etc. The PAT identifies the PID value of the elementary stream for the program map table (PMT) of a program included in the transport stream. A PMT for a program lists all of the PID values of the elementary streams of the program. Thus, the process of identifying a program and its contents takes place in two stages: first one uses the PAT in the PID=0 elementary stream to identify the PID of the elementary stream carrying the PMT for the program, and then in the next stage one obtains the PIDs of the elementary bit streams that make up the program from the appropriate PMT. A demultiplexer or decoder can be set to receive the identified packets that correspond to the program of interest. For proper viewing, the elementary streams must be synchronized so that the audio and video signals of the program correspond to each other.

A subscriber of a digital network will generally receive multiple transport streams, each of which are identified by a transport stream identifier (TSID). Generally, a subscriber selects a particular program and the subscriber's decoder consults tables such as, for example, an electronic program guide to determine the TSID for the program stream having the selected program. For such a system to work, each transport stream received at the subscriber's decoder must be uniquely identified, i.e., each transport stream received by a subscriber's decoder needs a unique TSID. A difficulty found in prior systems is that the operator of a digital subscriber network frequently receives content such as transport streams from multiple content providers, and frequently, the operator of the digital subscriber network has to remap TSIDs so that the transport streams from different content providers are unique within the digital subscriber network. In prior networks, the operator of the network would manually assign TSIDs to the transport streams of the network. However, manual TSID assignment is an inefficient utilization of the operator's time, and thus, there exists a need for a means to automatically assign TSIDs.

In addition, in prior digital subscriber networks, the operator of the network does not have dynamic network information provided to him. The operator has no means for determining the current bandwidth that is available in any communication link carrying a transport stream. Thus, the operator can only guess at the current available bandwidth for a transport stream when trying to decide whether to add another program to the transport stream. If the operator overestimates the available bandwidth, then the new program may cause the bandwidth of the transport stream to exceed the bandwidth of the communication link, and consequently, a phenomena known as "macro blocking" occurs. When macro blocking occurs packets are dropped from the transport stream, which results in the degradation of the quality of programs in the transport stream, which in turn causes many subscribers to complain. On the other hand, if the operator underestimates the available bandwidth, so as to ensure against macro blocking, the network is not operating at its full efficiency, and the operator is wasting bandwidth. Bandwidth in the digital subscriber network is a very valuable commodity, and thus, digital subscriber networks need dynamic network information that allows the operator to intelligently allocate network resources.

In prior systems, a system controller handles many administrative functions of the digital subscriber network. For example, the subscriber may request a service such as a personal session in the network. The system controller, among other things, establishes the session for the subscriber, determines how to deliver the content for the session to the subscriber and bills the subscriber for the session. Thus, there exists a need for a redeuction in the processing burden placed upon the system controller.

BRIEF DESCRIPTION OF THE DRAWINGS

FIGS. 5A-5C, are flow charts of an exemplary steps used by controllers in the broadband communication system for mapping the network of the broadband communication system.

FIG. 6 is a block diagram of a network message.

FIG. 7A is a block diagram of an exemplary network prior to mapping the exemplary network.

FIG. 7B is a table that associates devices in the exemplary network, shown in FIG. 7A, with transport stream identifiers.

FIG. 7C is a block diagram of the exemplary network, shown in FIG. 7A, after the mapping the transport streams in the exemplary network.

DETAILED DESCRIPTION OF PREFERRED EMBODIMENTS OF THE INVENTION

The preferred embodiments of the invention will be described more fully hereinafter with reference to the accompanying drawings in which like numerals represent like elements throughout the several figures, and in which an exemplary embodiment of the invention is shown. This invention may, however, be embodied in many different forms and should not be construed as limited to the embodiments set forth herein. All examples are intended to be non-limiting, with additional examples being included within the scope of the present invention.

Television System Overview

One preferred embodiment of the invention is best understood within the context of a two-way, interactive digital subscriber television system, as an example. In this discussion, the two-way interactive digital subscriber television system is also referred to as a Digital Broadband Delivery System (DBDS) or a digital subscriber network. An overview of an exemplary DBDS is provided in U.S. Pat. No. 6,157,719, entitled "Conditional Access System", which is hereby incorporated by reference herein in its entirety. A function of the DBDS is to provide interfaces to content providers, entitlement agents, control access to and the use of the content, and to distribute the content to subscribers. The DBDS uses Motion Picture Experts Group (MPEG) transport streams for delivery of video, audio, and data entertainment programming. These can include, among others, programming and data information such as local television channels, premium movie channels, video-on-demand (VOD), telephone services, and Internet access.

Figure 1:
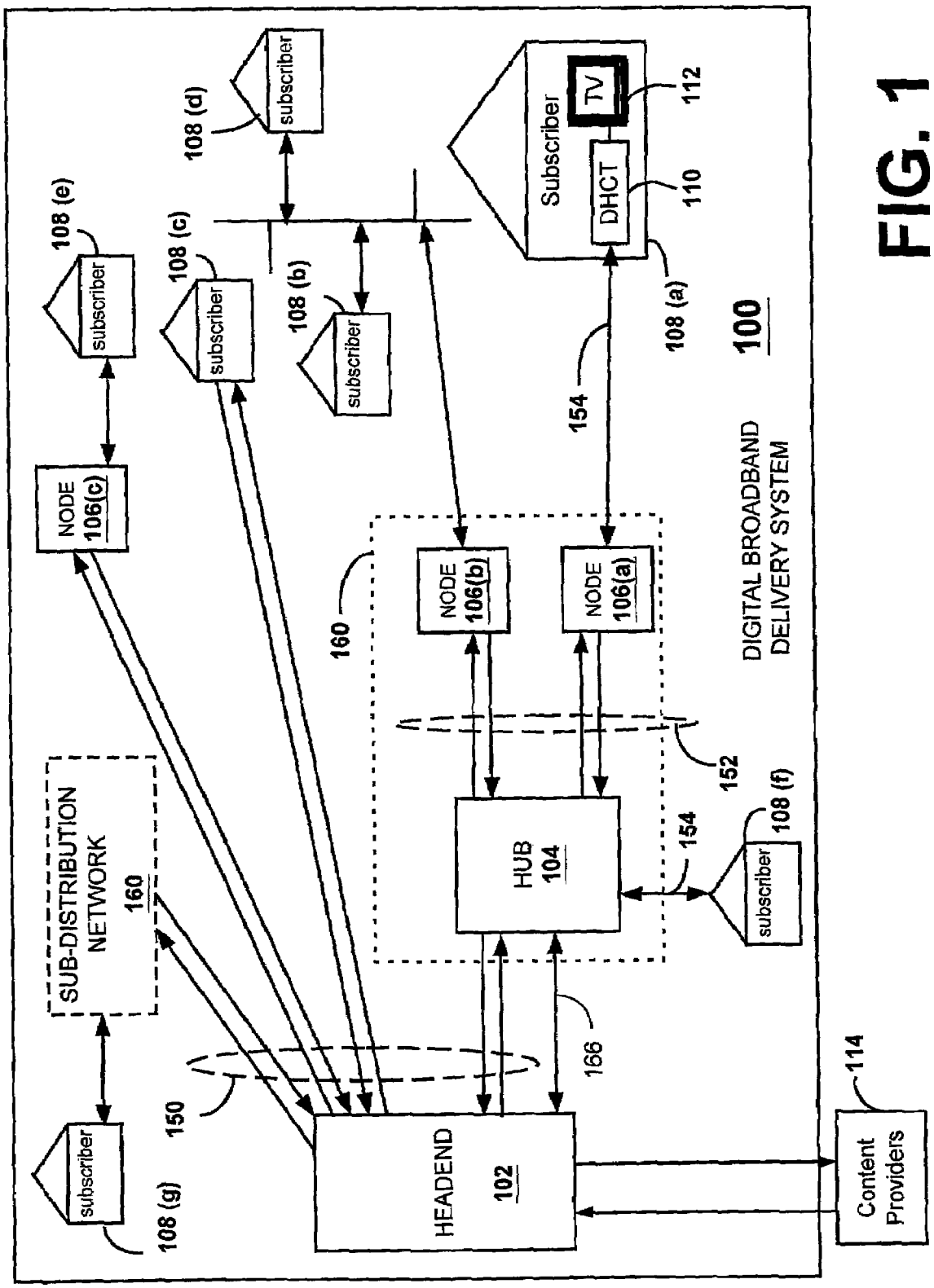
FIG. 1 is a block diagram of a broadband communications system, such as a cable television system, in which the preferred embodiment of the invention may be employed.

Referring to FIG. 1, a digital broadband delivery system (DBDS) 100 includes a headend 102, a plurality of hubs 104, multiple nodes 106, a plurality of subscriber locations 108, and a plurality of digital home communication terminals (DHCTs) 110. The headend 1102 provides the interface between the DBDS 100 and content providers 114, such as broadcasters, Internet service providers, and the like. The transmission medium between the headend 102 and the content providers 114 can be two-way. This allows for two-way interactive services such as Internet accesses via DBDS 100.

Unlike the prior distribution systems, which have a main trunk and branches, the DBDS 100 includes a headend 102 in direct communication, via transmission medium 150 with a plurality of hubs 104, which are in communication, via transmission medium 152, with a plurality of nodes 106. However, in alternative embodiments, the headend 102 can be in direct communication with some or all of the nodes 106 and with some or all of the subscriber locations 108. Whether the headend 102 communicates directly to nodes 106 and/or subscriber locations 108 is a matter of implementation.

The hub 104 receives programming and other information from headend 102 via transmission medium 150 and transmits information via transmission medium 152 to nodes 106, which then transmit the information to subscriber locations 108 through transmission medium 154. The hub 104 also transmits information directly to subscriber locations 108 via transmission medium 154. Again, whether the hub 104 communicates directly to subscriber locations 108 or to nodes 106 is a matter of implementation.

In the preferred embodiment, the transmission medium 150 and 152 are optical fibers that allow the distribution of high quality and high-speed signals, and the transmission medium 154 is either broadband coaxial cable or optical fiber. In alternative embodiments, the transmission media 150, 152 and 154 can incorporate one or more of a variety of media, such as optical fiber, coaxial cable, and hybrid fiber-coax (HFC), satellite, direct broadcast, or other transmission media. Typically, the transmission media 150, 152 and 154 are two-way communication media through which both in-band and out-of-band information are transmitted. Through the transmission media 150, 152 and 154 the subscriber locations 108 are in direct or indirect two-way communication with the headend 102 or the hub 104.

The DBDS 100 includes a plurality of sub-distribution networks 160 connected to the headend 102 by communication media 150. Each sub-distribution network 160 includes a hub 104 and the plurality of nodes 106, which are connected to the hub 104. The hub 104, which is also connected to the headend 102 through communication link 166, functions as a mini-headend for the introduction of programming and data information to sub-distribution network 160. By having a plurality hubs 104 that function as mini-headends, the introduction of different data information and programming to various sub-distribution networks 160 is facilitated. For example, the subscriber location 108(B), which is connected to node 106(B), can receive data information and programming that is different from the data information and programming available to subscriber location 108(C), which is connected directly to headend 102, even though the subscriber locations 108(B) and 108(C) may be in close physical proximity to each other. Data information and programming for subscriber location 108(B) are routed through hub 104 and node 106(B), and hub 104 can introduce data information and programming into the DBDS 100 that are not available through the headend 102.

At the subscriber locations 108, a decoder or a DHCT 110 provides the two-way interface between the DBDS 100 and the subscriber. The DHCT 110 receives the data information and programming either directly or indirectly from the headend 102 or hub 104 and decodes signals, including signals for display on a display device, such as a television set (TV) 112 or a computer monitor. Those skilled in the art will appreciate that in alternative embodiments the equipment for decoding the signal can be located in a variety of equipment, including, but not limited to, a DHCT, a computer, a TV, a monitor, or an MPEG decoder.

Subscribers in the DBDS 100 can request services from the operators of the DBDS 100. Services provided to subscribers include, but are not limited to, telephonic services, Internet access, audio programming, television programming and pay-per-view services, such as, video-on-demand.

Figure 2:
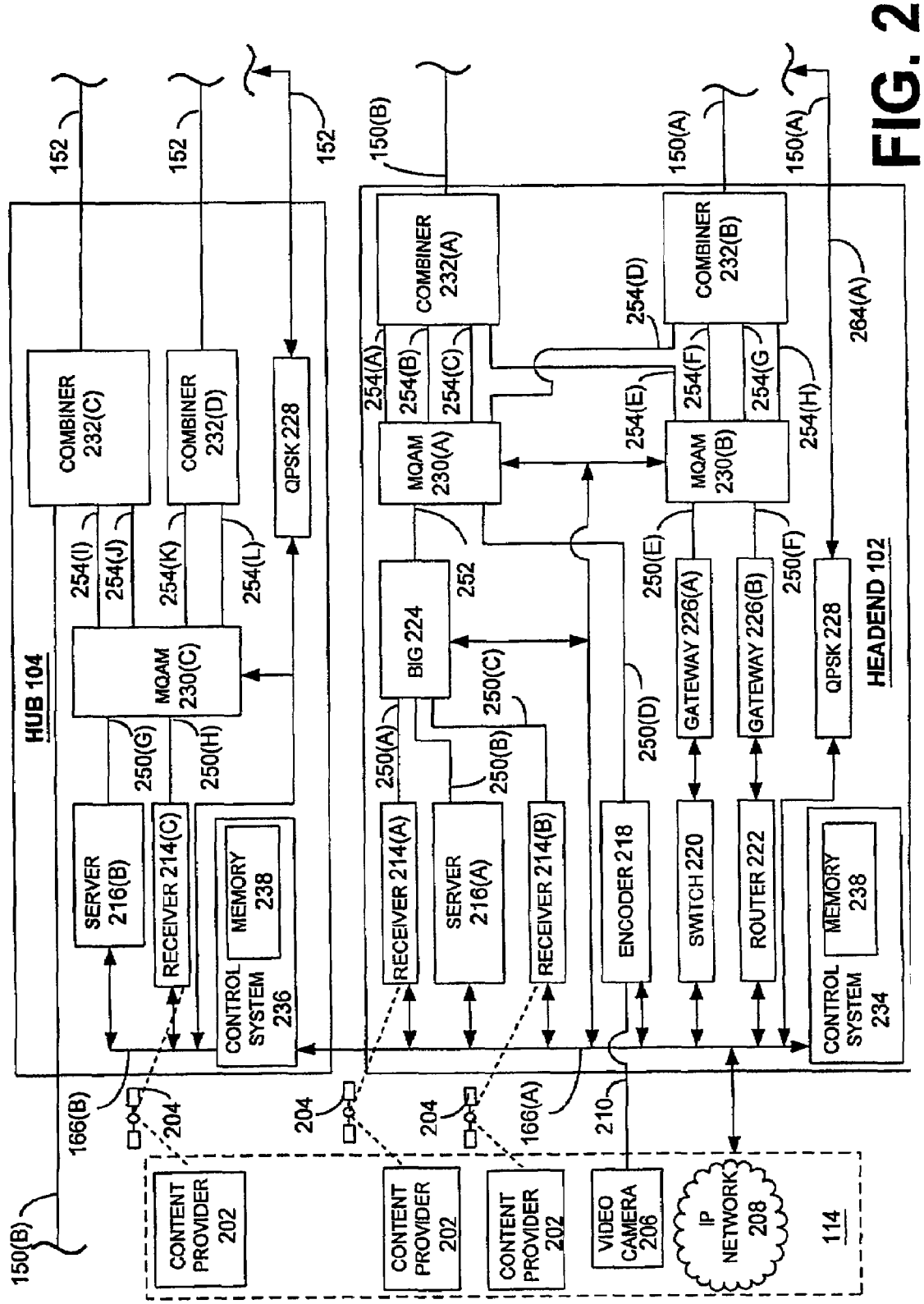
FIG. 2 is a block diagram of a headend and a hub, which are in communication with content provider, in the broadband communication system in which the preferred embodiment of the invention may be employed.

Referring to FIG. 2, the hub 104, which is a mini-headend, includes some or all of the equipment and functionality as the headend 102. The headend 102 and hub 104 include network controller 234 and sub-network controller 236, respectively. The controllers 234 and 236 are in communication through communication link 166. In one embodiment, the communication link 166 is a twisted wire pair for carrying 10 baseT transmissions. Alternative communication links include, but are not limited to, fiber optic cable, coaxial cable, and hybrids thereof.

The network controller 234, which preferably includes computer hardware and software providing the functions discussed hereinbelow, allows the television system operator to control and monitor the functions and performance of the DBDS 100. For example, network controller 234, such as Scientific-Atlanta's Digital Network Control System (DNCS), without limitation, monitors, controls, and coordinates communications in the DBDS 100, including video, audio, and data. The network controller 234 can be located at headend 102 or remotely.

The controllers 234 and 236 interface with various components, via communication link 166, in order to monitor and/or control a variety of functions, including the channel lineup of the programming for the DBDS 100, billing for each subscriber, conditional access for the content distributed to subscribers, initiating, managing and ending sessions and controlling, managing, and identifying network transport streams. The various components in communication with the controllers 234 and 236 include satellite signal receivers 214, application servers 216, encoder 218, switch 220, router 222, broadband integrated gateway (BIG) 224, Quadrature Phase-Shift Keying (QPSK) modem array 228 and multi-quadrature amplitude modulator (MQAM) 230.

The network controller 234 communicates information, such as conditional access information, to BIG 224, where it is multiplexed into transport stream 252. Among other things, the network controller 234 or sub-network controller provides input to the MQAMs 230 for setting their operating parameters, such as selecting certain programs or portions of transport streams 250 and 252 for inclusion in one or more output transport stream 254, and/or providing conditional access information. Control information and other data can be communicated from the headend 102 to the hubs 104 via in-band communication through communication link 150. The QPSK modem arrays 228 enable out-of-band two-way communication between the DHCTs 110 connected to headend 102 and the DHCTs 110 connected to the hub 104. The out-of-band communication from the DHCTs 110 includes control information such as pay-per-view purchase instructions and pause viewing commands from the subscriber location 108 (shown in FIG. 1) to a video-on-demand type application server 216.

In an alternative embodiment, the network controller 234 interfaces with device-controllers (not shown), which are preferably located in the headend 102; however, they may be located elsewhere. A device-controller is adapted to receive messages from devices in the headend 102 and hub 104 including the network controller 234 and from DHCTs 110 and is adapted to control devices such as, but not limited to, application server 216. Device-controllers reduce the processing load placed upon the network controller 234 by controlling devices in the headend 102 and hub 104, and among other things responding to messages from DHCTs 110 for subscriber services such as, but not limited to, receiving a pay-per-view program and initiating a "Personal Television" session.

In the preferred embodiment, the headend 102 and hub 104 each include at least one satellite signal receiver 214, at least one application server 216, at least one MQAM 230, a QPSK modem array 228, and at least one combiner 232. It is to be understood that hub 104 can include more or less or different equipment than is listed hereinabove, that the type of equipment and the quantity of equipment found in hub 104 is a matter of implementation, and that the equipment can be different from the equipment found in the headend 102.

The headend 102 receives content such as programming, data information and other information from a variety of content providers 114, which can provide input in a variety of ways. In the preferred embodiment, the hub 104 is adapted to receive content from at least one content provider and also to receive content from the headend 102 through communication link 150(B). The headend 102 and hub 104 combine the content from the various sources and distributes the content either directly or indirectly to subscribers 108. The content providers 114 include content provider 202, which can provide programming such a television programming, video camera 206 and internet service provider 208. The input signals may be transmitted from sources to the headend 102 and hub 104 via a variety of transmission paths, including satellites 204, direct feed 210 and other transmission paths known to those skilled in the art. The signals provided by the content providers 114 or programming input sources can include a single program or a multiplex that includes several programs. Although hub 104 is shown as receiving content via a satellite 204, it is to be understood that this is a non-limiting example. In the preferred embodiment, hub 104 is capable of receiving content from one or more content providers including, but not limited to, internet service providers and video cameras via one or more transmission paths including, but not limited to, direct feed, terrestrial broadcast transmitter and antenna (not shown), and other communication links know to those skilled in the art.

In the preferred embodiment, satellites 204 relay the content from the content provider 202 to satellite signal receivers 214, and each one of the satellite signal receivers 214 is associated with a content provider 202. Generally, the content received from the content providers 202 is in the form of a transport stream, which the satellite signal receivers 214 output as network transport streams 250. In the headend 102, the network transport streams 250 from satellite signal receivers 214(A) and 214(B) are input into the broadband integrated gateway (BIG) 224; and in the hub 104, the network transport stream 250(H) from satellite signal receiver 214(C) is input into MQAM 230(C). It is to be understood that this configuration is a matter of implementation, and that in alternative embodiments the network transport streams 250 from the satellite signal receivers 214 could be input into other equipment typically found in the headend 102 or the hub 104.

In the preferred embodiment, the beadend 102 and hub 104 also include application servers 216, which provide a variety of data information such as a Pay-Per-View service, including, but not limited to, video on demand (VOD), a data service, an Internet service, a network system, or a telephone system. Content providers 114 may download content to an application server 216 located within the DBDS 100. The application servers 216(A) and 216(B), which are located in the headend 102 and hub 104, respectively, output network transport streams 250(B) and 250(G), respectively, which are input into BIG 224 and MQAM 230(C), respectively. Again, it is to be understood that the equipment that receive transport streams 250(B) and 250(G) is a matter of implementation, and that the configuration shown in FIG. 2 is only one of many possible configurations known to those skilled in the art.

In the preferred embodiment, the BIG 224 can be located in the headend 102 or in the hub 104, and it is adapted to receive a plurality of network transport streams 250 and multiplex the network transport streams into a single output network transport stream 252. The BIG 224 receives network messages and commands from the network controller 234 through communication link 166. The network messages and commands include information necessary for the BIG 224 to multiplex the input transport streams 250 into an output transport stream 252.

Switch 224, an example of which is an asynchronous transfer mode (ATM) switch, and the router 222 provide an interface to a gateways 226(A) and 226(B), respectively; and the gateways 226(A) and 226(B) provide, among other things, access to the internet and output network transport streams 250(E) and 250(F), respectively. The router 222 receives messages from the DHCTs 110 via QPSK modem array 228. The messages from the DHCTs 110 frequently include session/control messages, which are used for creating and controlling a session. Typically, the router 222 routes the session/control messages to the application server 226(A), or the router 222 sends the messages to other appropriate devices such as network controller 234 or sub-network controller 236. The headend 102 and hub 104 also contain at least one modulator that receives a network transport stream and converts the transport stream into a modulated signal, such as, for example, a radio frequency modulated signal. In the preferred embodiment, the hub 104, which acts as min-headed, introduces programming into the DBDS 100, which is modulated and transmitted by MQAM 230. Generally, the headend 102 includes a plurality of MQAMs 230, and hub 104 includes at least one MQAM. In alternative embodiments, the headend 102 and hub 104 include other transmitters for transmitting content to the subscribers 108.

Each MQAM 230 is adapted to receive a plurality of network transport streams (250 and 252) and output a plurality of modulated network transport streams 254. The number of input and output network transport streams to and from MQAM 230 is a matter of implementation. In the preferred embodiment, MQAMs 230 include a plurality of modulators, such as, but not limited to, QAM modulators, that modulate and transmit the output transport streams 254.

The modulated network transport streams 254 from the MQAMs 230 are combined, using equipment such as combiners 232, for input into the transmission medium 150 and 152. The combined signals are sent as the in-band information to the subscriber locations 108. In the preferred embodiment of the DBDS 100 each network transport stream 254 is modulated to a set frequency. For the DHCT 110 (shown in FIG. 1) to receive an elementary stream of one of the network transport streams 254, the DHCT 110 must tune to the frequency associated with the modulated network transport stream that contains the desired information, de-multiplex the transport stream, and decode the appropriate elementary stream. In the preferred embodiment, devices coupled to communication link 166 have unique addresses, such as IP addresses or MAC addresses, that are used to identify both the recipient and the source of messages. The network controller 234 includes a memory 238 that includes tables, such as, an address table for the devices coupled to communication link 166. In one embodiment, the address table also includes device information that is associated with each address for identifying the type of device. For example, the address of satellite signal receiver 214(A) is associated with device information such as "receiver" and the device information for sub-network controller 236 is "controller." In which case, the network controller 234 can use the address table to determine the network function of a device that sends a message to the network controller. In one embodiment, the memory 238 also includes an address table for DHCTs 110. The address for each of the DHCTs 110 can be either static or dynamically assigned.

The address table is updated whenever a new device is connected to communication link 166 or whenever a new DHCT 110 is connected to a sub-distribution network 160 or connected directly or indirectly to headend 102. In one embodiment, the updating of the address table is performed manually. Those skilled in the art will recognize that instead of manually updating the address table to include the address of a newly connected device, there are self-actuating systems in which a newly connected device pings the network controller 234. After the network controller 234 is pinged, the address table is automatically updated by the controller 234.

In the preferred embodiment, the sub-network controller 236 also includes a memory 238, which has an address table stored therein. The address table of the sub-network controller 236 includes a unique address for each device coupled to communication link 166(B), and the address table of sub-network controller 236 is updated whenever another device is connected to communication link 166(B). In an alternative embodiment, the address table of sub-network controller 236 also includes the addresses for DHCTs 110 coupled to hub 104. In another embodiment, the address table of the network controller 234 is a system wide address table of all of the devices in DBDS 100, and the address table of the sub-network controller 236 can include some or all of the devices within DBDS 100.

Network Map

To properly manage the DBDS 100 and to provide for distributed processing it is desirable for the network controller 234 and/or the sub-network controller 236 to have a map of network transport streams. Although content providers 114 provide transport streams to the DBDS 100, the transport streams from the content providers 114 are not network transport streams. For the purposes of this disclosure, a network transport stream is a transport stream that has been transmitted from a device within the DBDS 100, such as, but not limited to, satellite signal receiver 214, server 216, MQAM 230 or BIG 224.

A network transport stream map for the network controller 234 can be any of the following, among others, a map of the network transport streams within the branches of the network directly controlled by the network controller 234, such as the headend 102 and the nodes 106 directly connected to the headend 102; a map of network transport streams throughout any portion of DBDS 100; or a map of network transport streams throughout the entire DBDS 100. Similarly, the network transport stream map of the sub-network controller 236 can be for any portion of the DBDS 100, such as the branches of the network within hub 104, or the entire DBDS 100. In yet another embodiment, the network transport stream map extends all the way down the network tree to the nodes 106 and the DHCTs 110.

Figure 3:
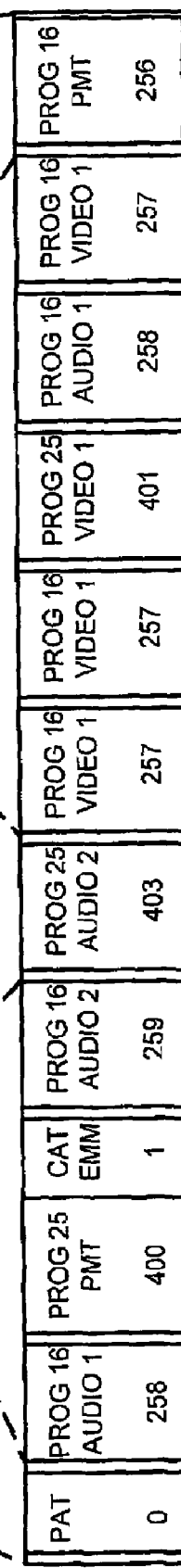
FIG. 3 is a block diagram representation of an MPEG transport stream and packets therein.

Referring to FIG. 3, for the sake of clarity a brief description of network transport stream 250(A) is provided hereinbelow. Network transport stream 250(A), which is representative of MPEG transport streams, is made up of a plurality of MPEG packets 300. Each of the MPEG packets 300 has a header 302 and a payload 304. The header 302 includes a packet identifier (PID) 306 that is used to identify the packet. Certain packets, such as program association tables (PATs), which are identified by the PID value of 0, have reserved PID values. PATs are used to associate programs with program map tables (PMTs), which are used to identify the PID values of the elementary streams of the programs. For example, the exemplary PAT shown in FIG. 3, associates a program number 16 with a PMT packet having a PID value of 256. Generally, a program is made up of a plurality of elementary streams, and each one of the elementary streams in transport stream 250 has a unique PID value. The exemplary PMT, shown in FIG. 3, lists the elementary streams and their respective PID values. Further details regarding MPEG transport streams can be found in U.S. application Ser. No. 09/845,510, "System And Method For Multicasting Packets In A Subscriber Network," filed on Apr. 30, 2001, which is hereby incorporated in its entirety by reference. Each MPEG transport stream has a transport stream identifier (TSID), which is part of the PAT of PID 0. In the exemplary PAT shown in FIG. 3, transport stream 250(A) is identified by the value "A." Typically, the TSID associated with a transport stream is a numerical value between 0-8191. In alternative embodiments, the TSID for a transport stream can be included in the header 302 or the payload 304 of a predetermined packet 300. For example, the PID value of 1 is reserved for conditional access tables (CAT), which include information related to the access and encryption of programs, and, in an alternative embodiment, the CAT can include the TSID. The TSID for a transport stream can be determined by knowing: (1) the PID value of the packet containing the TSID value, and (2) the location of the TSID in the packet. Therefore, it does not matter whether the TSID is in the PAT (PID=0) or the CAT (PID=1) or in some other predetermined packet.

Figure 4:
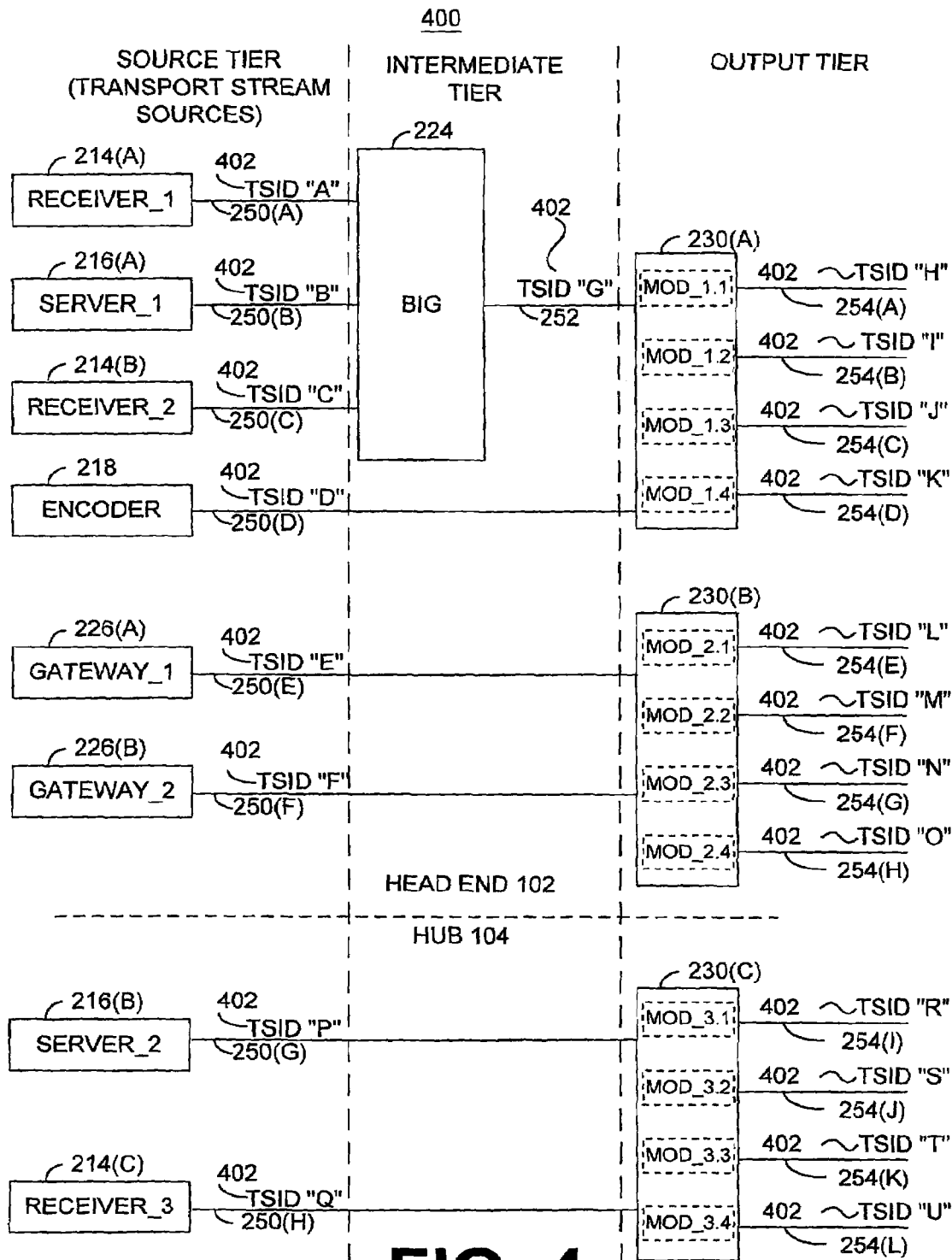
FIG. 4 is a block diagram of network transport stream sources and network transport stream handlers in the broadband communication system in which the preferred embodiment of the invention may be employed.

Referring to FIG. 4, network transport stream map 400 maps network transport streams 250, 252 and 254 and transport stream devices within the headend 102 and hub 104. Each transport stream device shown in transport stream map 400 is either a network transport stream source or a network transport stream handler. For the purposes of this disclosure, a network transport stream source is a device in the DBDS 100 from which a network transport stream originates. Other network transport stream sources include, but are not limited to, application servers 216, encoder 218 and gateways 226.

In the preferred embodiment, each network transport stream source is adapted to receive content and transmit the content as a network transport stream with a predetermined TSID. Frequently, the content is received at a network transport stream source as a transport stream with an input TSID. In which case, the network transport stream source is adapted to remap the input TSID to a predetermined TSID, which may or may not differ from the input TSID, and transmit the received content as a network transport stream. The network transport stream sources are usually in communication with a controller such as network controller 234 or sub-network controller 236, and the controller determines the TSID for the network transport stream.

The DBDS 100 also includes network transport stream handlers such as, but not limited to, BIG 224 and MQAMs 230, which are adapted to receive at least one network transport stream and transmit at least one network transport stream. In the preferred embodiment, each network transport stream handler includes the necessary logic for mapping the TSID of an output network transport stream to a predetermined value, which may or may not differ from the TSID value of the input network transport stream. For example, MQAM 230(A) can map the TSID 402 of network transport stream 254(A) from a value of "H" to "Z." Generally, the network transport stream handlers are in communication with a controller such as network controller 234 or sub-network controller 236 and the controller determines the TSID for the network transport stream, and the network transport stream handlers remap TSIDs in response to a message from the controller.

In the network transport stream map 400, the devices of the head end 102 and the hub 104 are grouped into tier levels: the first tier level is the source tier; the second tier level is an intermediate tier level; and the last tier level is the output tier level. For the purposes of this disclosure, an output tier device is the last network transport stream handler to receive a network transport stream before the network transport stream is received by a DHCT 110. Thus, referring to FIG. 2, even though combiners 232 receive network transport streams from MQAMs 230 they are not included in the transport stream map, because the combiners 232 are not transport stream handlers, i.e., they cannot map TSIDs 402. It should be noted that even though transport stream map 400 shows that all of the output tier devices are MQAMs, those skilled in the art will recognize other devices that can be the last device to receive (and map) a transport stream, and all such other devices are intended to be within the scope of the invention. Other output tier transport stream handlers include, but are not limited to, QAM modulators, and Continuum modulators. In addition, intermediate tier devices include, but are not limited to, BIG 224, teleco interface units (not shown), and sonet transmitters and sonet receivers.

Interposing the source tier devices and the output tier devices are the intermediate tier devices. Intermediate tier devices include network transport stream handlers included in the DBDS 100 that are not output tier devices. In the exemplary transport stream map 400, BIG 224 receives network transport streams 250(A)-250(C), and transmits network transport stream 252 identified by TSID 402, which has the value of "G," to output tier device MQAM 230(A). It should be understood that there may exist sub-intermediate tier levels, i.e., several intermediate tier devices can be serially connected together. For example, in an alternative network, BIG 224 transmits transport stream 252 to another transport stream handler (not shown), which is not an output tier device. In which case, the other transport stream handler would be grouped in a sub-intermediate tier level between the intermediate tier level having BIG 224 and the output tier level. In the preferred embodiment, each of the network transport streams 250(A)-250(H), 252, and 254(A)-254(L) have unique TSIDs 402. Uses of the transport stream map 400, and the manner in which it is created shall be discussed in detail hereinbelow.

The logic of the present invention can be implemented in hardware, software, firmware, or a combination thereof. In the preferred embodiment, the logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

Figure 5A:
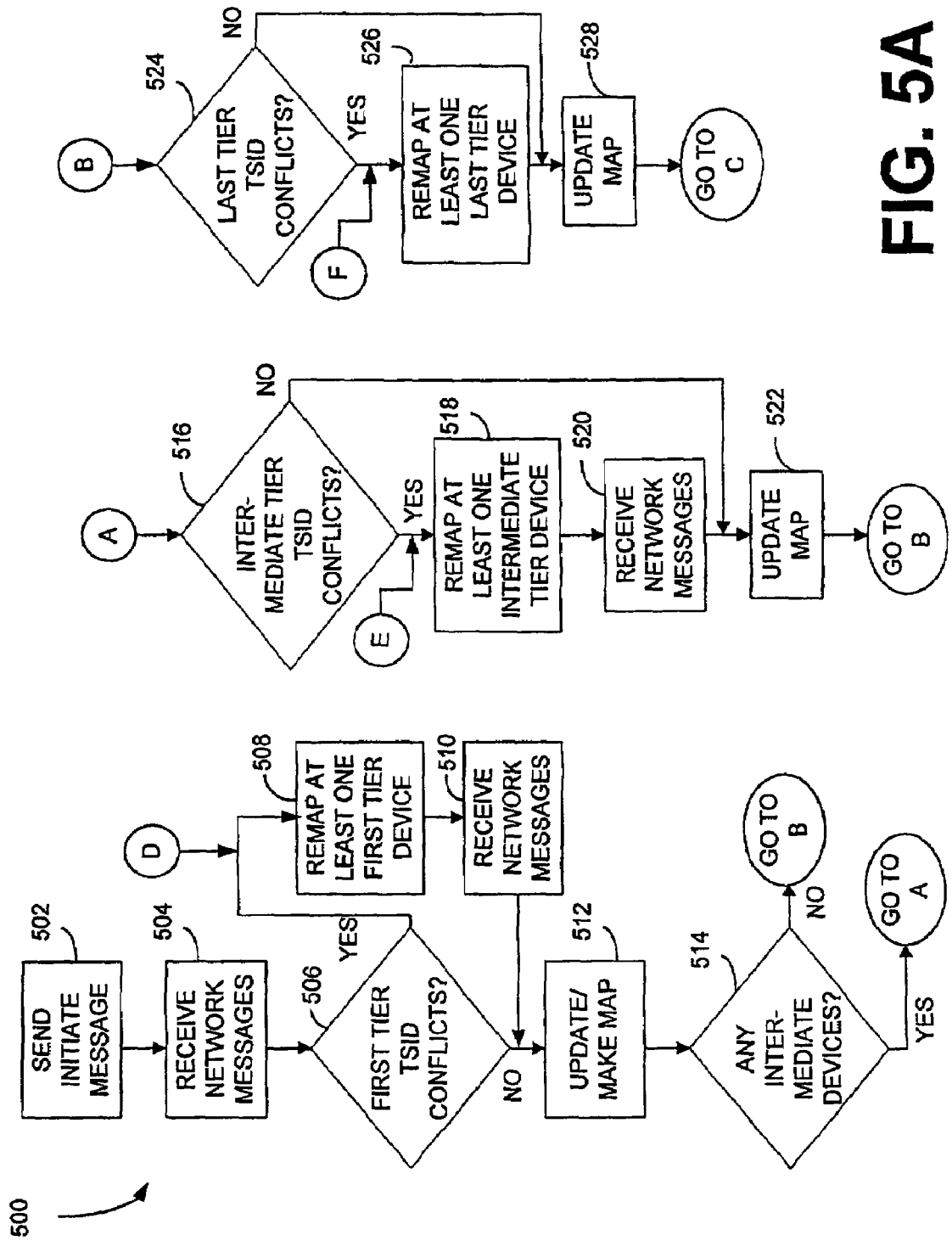

Referring to FIGS. 5A, 5B and 5C, shown are exemplary steps 500 for creating network transport stream map 400. In a typical DBDS 100, the network controller 234 is heavily utilized, and therefore, it is generally desirable to distribute, as much as possible, the processing for operating and maintaining the DBDS 100. In the preferred embodiment, each controller, either network controller 234 or sub-network controller 236 or device-controller (not shown), implements the steps 500 for devices within their respective branches of the network tree to make the network transport stream map 400. The network controller 234 maps the branches of the network tree for the headend 102, and the sub-network controller 236 maps the branches of the network transport streams for hub 104. For example, sub-network controller 236 maps satellite signal receiver 214(C) and server 216(B) as source tier devices and MQAM 230(C) as an output tier device. In an alternative embodiment, the network controller 234 implements steps 500 for the entire network. In yet another alternative embodiment, the sub-network controller 236 implements the steps 500 for a plurality of branches of DBDS 100.

In step 502, the network controller 234 and/or the sub-network controller 236 sends an initiate network transport stream map (INTSM) message to devices in DBDS 100 to initiate the creation of the transport stream map 400. In the preferred embodiment, the network controller 234 sends the INTSM message to devices coupled in communication link 166(A) including sub-network controller 236. When the sub-network controller 236 receives the INTSM message, the sub-network controller 236 transmits an INTSM message to devices within hub 104 coupled to communication link 166(B). In an alternative embodiment, the network controller 234 transmits the INTSM message to all of the devices coupled to communication links 166. In yet another embodiment, the DHCTs 110 coupled directly or indirectly to the headend 102 receive an INTSM message through out-of-band communication and are included in the network transport stream map 400.

In the preferred embodiment, each network transport stream source and each network transport stream handler responds to the INTSM message by sending a network message 600, shown in FIG. 6, to the controller that sent the INTSM message. For example, satellite signal receiver 214(C), server 216(B), and MQAM 230(C) each send the network message 600 to the sub-network controller 236, and devices in the head end 102, such as a satellite signal receiver 214(A) and MQAM 230(A), send network message 600 to the network controller 234.

Referring to FIG. 6, the network message 600, which is sent in response to an INSTM message, includes a device type field 602, an output TSID field 604, an input TSID field 606, and a network status field 608. The device type field 602 indicates the type of device that is sending network message 600. Possible designations for the type of device include, but are not limited to, transport stream source, transport stream handler, satellite signal receiver, server, video-on-demand server, gateway, MQAM, modulator, DHCT, etc. The device-type field 602 can also include a device identifier that is associated with the device for identifying the device. For example, the device-type field 602 for satellite signal receivers 214(A)-214(C) might be "receiver_1," "receiver_2," and "receiver 3," respectively. It should be noted that devices that transmit multiple output transport streams return a network message 600 for each of their output network transport streams. For example, MQAM 230(A) transmits 4 output network transport streams 254(A)-254(D), and therefore, it sends four network messages 600. In the preferred embodiment, each network message 600 has a different device type field 602, which is used for identification purposes. For example, a first network message 600 from MQAM 230(A) might have "MQAM_1.1" as the device-type field 602, and a fourth network message from MQAM 230(A) might then have "MQAM_1.4" as the device-type field 602. For devices that transmit a plurality of transport streams, the device type field 602 can be thought of as a device indicator such as "MQAM_1" with an appended transmitter identifier such as, for example, "0.1" or "0.4." In a similar fashion, MQAM 230(B) responds to the INSTM message with four network messages 600 having device type fields 602 ranging from "MQAM_2.1"-"MQAM_2.4."

The output TISD field 604 indicates the value of the TSID for the output network transport stream. The output TSID field 604 is null for network messages received from DHCTs 110.

The input TSID field 606 indicates the number of input network transport streams received by the device and the TSID value of each received network transport stream. Thus, for each network transport stream source the number of inputs is zero, and for each network transport stream handler the number of inputs is at least one. The input TSID field 606 is null for network messages from transport stream sources.

The network status field 608 includes network information, such as, but not limited to, available bandwidth, bit error rate (BER), lost link, over allocation of bandwidth, and input good or input bad. The controller can use the network status information to monitor and dynamically control the network.

Referring again to FIG. 5, in step 504 the controller receives the network messages 600 from the network transport stream sources and the network transport stream handlers in the network transport stream branches that are controlled by the controller. The controller reads the device-type field 602 for each of the received network messages 600 and sorts the messages into groups corresponding to source tier, intermediate tier, and output tier devices. In the preferred embodiment, the controller has a table stored in memory 238, which relates each type of device indicated by device type field 602 to a tier of the transport stream map 400. For example, the table relates satellite signal receivers 214 and servers 216 as network transport stream sources, MQAMs as last tier devices, and BIGs as intermediate tier devices. In another embodiment the controller determines which of the network messages 600 are from source tier devices by finding the network messages that have a null field for input TSID field 606.

In the next step 506, the controller reads the output TSID field 604 of the network message 600 from each of the network transport stream sources and determines if two or more of the network transport streams 250, which are from network transport stream sources, have the same value for their TSID 402. For the purposes of this disclosure, when two or more network transport streams in a sub-distribution network 160 or in DBDS 100 have the same TSID value, the network transport streams that have the same TSID value are determined to be conflicting. If there are none of the values of the TSIDs 402 from the source tier devices conflict, the controller proceeds to step 512, otherwise, the controller proceeds to step 508.

When there are two or more network transport stream sources have conflicting TSIDs, then in step 508 the controller sends a TSID remap message to at least one of the network transport stream sources that outputs a conflicting network transport stream. Devices that receive a TSID remap message respond by remapping the value of the TSID 402 to a new value, which is indicated by the remap message. For example, if the values for the TSIDs 402 of network transport streams 250(A) and 250(F), shown in FIG. 4, were the same, the network controller 234 would send a remap message to either receiver 214(A) or gateway 226(B). The remap message would instruct the device to remap the value of the TSID 402 to a new value, and the new value would be chosen such that it is also different from the values of the TSIDs 402 of the network transport streams 250(B)-250(F). If the network controller 234 is only mapping the headend 102, the new TSID value would be different from the TSIDs 402 that are associated with the network transport streams 250(B)-250(H). After remapping conflicting TSIDs, each of the values of the TSIDs 402 that are associated with network transport stream 250 are different from each other.

In the preferred embodiment, network transport stream handlers monitor their respective input transport streams and respond to changes in the transport stream. As will be explained in greater detail hereinbelow, at least one network transport stream handler will send a network message 600 to the controller when a network transport stream source remaps a conflicting TSID. For example, if satellite signal receiver 214(A) remaps the value of the TSID 402 of network transport stream 250(A) from "A" to "Z", then the BIG 224 notices the change in the value of the TSID 402 of transport stream 250(A) and responds by sending another network message 600, which reflects the current status of the network, to the network controller 234. The input TSID field 606 of the network message 600 from BIG 224 would indicate three input network transport streams 250(A)-250(C) having values "Z", "B" and "C" for their respective TSIDs 402. So, after the controller sends a remap message to a network transport stream source, then in step 510, the controller receives at least one network message 600 from a network transport stream handler.

Next in step 512, the controller create/updates the source tier level of transport stream map 400 by associating the device-type field 602 with the output transport stream field 604 of network message 600 for each one of the network transport stream sources.

After creating the source tier of transport stream map 400, the controller proceeds to step 514 where it determines whether any of the network messages 600 came from intermediate tier devices. Again, the controller uses tables stored in memory 238 to determine which network messages 600, if any, came from intermediate devices. If there are intermediate tier devices, the controller proceeds to step 516, otherwise the controller proceeds to step 524.

In step 516, the controller reads the output TSID field 604 for each network message from an intermediate tier device and checks for conflicting TSIDs 402. Again, if two or more of the network transport streams from intermediate tier devices have conflicting TSIDs 402, then the controller sends a TSID remap message to at least one of the conflicting intermediate tier devices that have conflicting TSIDs 402. Also, if a network transport stream 252, which is from an intermediate tier device, has a value for TSID 402 that conflicts with a TSID 402 for a network transport stream 250, which is from a source tier device, the intermediate tier device is sent a remap message. For example, in the head end 102, if the TSID 402 associated with the network transport stream 252 from BIG 224 had a value of "F," which is the same as the value of the TSID 402 associated with the network transport stream 250(F) from gateway 226(B), then the network controller 234 would send a remap message to BIG 224 to remap that conflicting TSID.

Again, network transport stream handlers that receive a network transport stream in which the TSID 402 is remapped will respond by sending a network message 600 to the controller. Thus, in step 520, the controller receives at least one new network message 600 from an output tier level device. The new network message 600 indicates the change in the remapped TSID 402.

After the controller receives the network messages 600, in step 522, the controller updates the transport stream map 400 by associating each device-type field 602 for intermediate devices with an input TSID 402, and with an output TSID 402 for the output network transport stream 252. By associating an intermediate tier level device with its input TSID the device is associated with a source tier level device, because only one source tier device outputs a transport stream having that particular TSID.

Referring again to step 516, if the controller determined that none of the intermediate devices had conflicting TSID 402, then the controller would proceed to step 522 to associate the intermediate tier devices with their associated output TSID(s) 402 and input TSID(s) 402.

After mapping the intermediate tier devices, if such mapping was necessary, the controller proceeds to step 524 where it reads the output TSID field 604 of each network message 600 from output tier devices and checks for conflicting TSID values. The controller checks for conflicting TSID values between the TSID values already assigned to network transport streams from the network transport stream sources and from the intermediate tier network transport stream handlers against the TSIDs 402 of the output tier network transport stream handlers. If there are no conflicting TSIDs, the controller proceeds to step 528 and updates the network transport stream map 400 by associating each device-type field 602 for output tier devices with at least one TSID 402 of an input network transport stream and a TSID 402 associated with an output network transport stream. Some output tier devices such as, but not limited to, MQAM 230 are associated with more than one input TSID 402.

On the other hand, if there is a TSID conflict, then in step 526, the controller remaps at least one of the conflicting TSIDs of the network transport streams 254 to a new nonconflicting value, by sending a TSID remap message to at least one of the output tier network transport stream handlers. The remap message instructs the device to remap the output TSID value to a value assigned by the controller.

In one embodiment, the network transport stream map 400 extends down to the DHCTs 110, and the DHCTs 110 are adapted to respond to INTSM messages by sending a network message 600 to the controller. The DHCTs 110 are also adapted to respond to changes in their received network transport streams 254 by sending another network message 600. Thus, in this embodiment, the controller receives multiple network messages 600 from DHCTs 110, when the controller instructs an output tier device to remap an output TSID value. The network messages 600 are used by the controller to associate the DHCTs with output tier devices.

After sending the remap message, the controller proceeds to step 528 and updates the network transport stream map 400, thereby associating each network transport stream handler in the output tier level with at least one input TSID value and an output TSID value. Again, it should be noted that the MQAM 230 has four output transport stream devices, i.e., four QAM modulators, and MQAM 230 provides a network message 600 for each of its QAM modulators. Therefore, each of the QAM modulators of MQAM 230 appears in transport stream map 400. Each output tier level device is associated with an upstream device through the input TSID.

In an embodiment, a controller implements step 502 through 528 for all of the network transport stream sources and handlers in DBDS 100, in which case the network transport stream map is completed at step 528. However, in the preferred embodiment, the processing is distributed between the network controller 234 and the sub-network controllers 236, in which case, after step 528, each controller has mapped the branches of the transport stream network controlled by that controller. For example, after completing step 528, the network controller 234 has mapped the headend 102, and the sub-network controller 236 has mapped the network transport streams of the hub 104.

Referring now to FIG. 5B, in step 532, the sub-network controller 236 sends its portion of the network transport stream map 400 to the network controller 234. At this point in time, each network transport stream in a sub-distribution network 160 has a unique TSID assigned to it, but the TSIDs between network transport streams of different sub-distribution networks 160 or between the headend 102 and a sub-distribution network 160 can conflict. The controller that is ultimately responsible for making the network transport stream map 400 such as network controller 234 checks for conflicting TSIDs. When there is a conflict, in step 534, the sub-network controller receives a TSID remap message from the network controller. On the other hand, if the sub-network controller 236 does not receive a remap message, then the sub-network controller is finished with making its portion of network transport stream map 400 of hub 104.

Referring to FIG. 5C, in step 536 the network controller 234 receives a portion of network transport stream map 400 from each of the sub-network controllers 236. Then in step 538, the network controller checks the entire network transport stream map for conflicting TSIDs 402. In one embodiment, each network transport stream of DBDS 100 has a unique TSID 402. So, if two or more network transport streams of DBDS 100 have the same TSID 402, the network controller 234 proceeds to step 540 and sends a remap message to remap one of the conflicting TSIDs 402. The remap message can be sent directly to a network transport stream source or to a network transport stream handler or to a sub-network controller 236, which then sends a remap message to the appropriate device(s). After the remapping has occurred, the network controller 234 proceeds to step 542 and updates the network transport stream map 400 to reflect the changes made in the network transport streams of the head-end 102. If the network controller 234 sent a remap message(s) to the sub-network controller(s) 236 it will receive a new network transport stream map(s) from the sub-network controller(s). At which point, the network transport stream map 400 is completed for the head end 102 and hubs 104.

It should be noted that a controller, a sub-network controller 236 or the network controller 234, can usually unambiguously map the network transport streams, the network transport stream sources and the network transport stream handlers by remapping the TSID 402 of the network transport streams. Referring now to FIG. 7A, consider, for example, a network 700 having network transport stream sources 702 and 704, intermediate transport stream handlers 706, 708, 710, 712 and 714, and output transport stream handlers 716, 718, 720, 722 and 724. Some network transport stream sources, such as satellite signal receivers, might not be configured to remap TSIDs and/or might not be configured to respond to INSTM messages. However, a partial network transport stream map that includes all of the network transports stream handlers can still be made.

In FIG. 7A the devices of the network 700 are shown connected by dashed lines, because the controller has not yet determined how they are connected. The initial TSID values of the transport streams are also shown in FIG. 7A. For this exemplary network, the details of the types of devices in network 700 are unimportant. The controller initially sends an INTSM message to all of the devices shown in FIG. 7A. In this example, the network transport stream source 704 does not or cannot respond to an INTSM message or a remap message.

In this example, the controller receives network messages 600 from all of the devices shown in FIG. 7A except for device 706. The controller makes table 750 from the received network messages 600. Table 750 associates each network transport stream device with its device type 752, with at least one input network TSID 754 and with an output TSID 756.

The controller reads the device type field 602, the output TSID field 604 and the input TSID field 606 of each received network message 600, and associates each device with its respective device type 752, input TSID 754 and output TSID 756. For example, the network message 600 from device 702(A) indicated that it was a device of type S_1, a source type of device and that its output network transport stream has a TSID value of A. In the preferred embodiment, the input TSID field 606 of network messages 600 from network transport stream sources is null. However, in an alternative embodiment, network transport stream sources include the TSID for their input transport streams in the network input TSID field 606 of network message 600. In which case table 750 would include input TSID values 754(A) for network transport stream sources 702(A)-702(C), which are associated with device types S_1, S_2 and S_3, respectively.

It should be noted that the controller received network messages 600 from 15 devices, and that there are 16 devices that output network transport streams. (Device 706 counts as three devices, because it sends a network message for each of its output network transport streams.) In this exemplary network, device 704 did not send a network message 600 in response to the INTSM message, and consequently, it does not appear in table 750.

After constructing table 750, the controller determines a new unique TSID for each output network transport stream for each device associated with a device type 752 in table 750; and the controller sends a remap message to each device having a device type listed in table 750. Devices that have multiple device types such as device 706 receive a remap message for each of their output network transport streams. A remap message sent to a given device indicates the new unique TSID for the output network transport stream from the given device.

Then, the controller updates table 750 to reflect the remapped output TSIDs 756(B) of the output network transport streams. Again, in the preferred embodiment, network transport stream handlers and network transport stream sources are adapted to respond to remap messages by changing the TSID of their output network transport stream; and network transport stream handlers are adapted to respond to a change in their input network transport stream by sending a network message 600 to the controller. Each of the network messages 600 that are sent to the controller in response to the remap messages include the input TSID field 606, which indicates the current TSID for the input network transport stream. The controller updates table 750 so that each device that responded with a network transport stream message 600 is associated with its new input TSID 754(B). Thus, when the controller sent device 702(A) a remap message, which remaps the TSID of its output network transport stream from "A" to "E", device 706 responds to the change by sending three network messages 600; one network message for each of its output network transport streams to the controller. Each of the network messages from device 706 indicate that it receives an input network transport stream with the TSID value of "E." The controller reads the network messages 600 updates table 750 to associate the current input TSIDs 754(B) with the device types 752.

It is easy for the controller to sequentially connect the network transport stream sources and handlers by using table 750 because each of the network transport streams has a unique TSID. Starting from a source tier device it is possible to construct the network transport stream map shown in FIG. 7C by matching output TSIDs 756(B) with input TSIDs 754 (B). For example, device 702(A), which is a network transport stream source of device type S_1, transmits a transport stream having the TSID value of "E." Device 706, which includes three components identified by device type D_1.1, D_1.2 and D_1.3, must be downstream from device 702(A), because device 706 receives a transport stream having the TSID value of "E." From table 750 it can also be determined that device 702(A) is the only input source for device 706. Furthermore, it can also be determined that device 708 is immediately downstream from devices 702(B) and 702(C), because it receives network transport streams having TSIDs of "F" and "G." Thus, table 750 can be used to map the transport streams from network transport stream sources 702 and all the network transport stream handlers downstream therefrom.

When the controller finds a device, such as device 724, that has an input TSID value that does not match any of the output TSID values 756(B), the controller then knows that there exists a transport stream source that did not respond to the initial INTSM message. The controller can then send an alert to the operator of the system that the map is incomplete. However, even though the controller does not know the type of device that is connected to device 724, the controller knows there is a device and that that device outputs a transport stream having a TSID value of "B." In this alternative embodiment, the operator responds to the alert by manually entering data to complete the network transport stream map of network 700.

The network transport stream map 400 is a dynamic map that reflects the current TSIDs of the network transport streams 250, 252 and 254. Each network transport stream handler responds to changes in its input network transport stream by sending a network message to their controller; and the controller dynamically updates the network transport stream map 400. The network transport stream map 400 maps the network transport streams from their sources to their output tier level devices or to the DHCTs 110, and the network transport stream map can be used by the operator of the DBDS 100. In one embodiment, a "master" network transport stream map 400 is stored in memory 238 of network controller 234. The "master" network transport stream map is stored in the memory 238 prior to maintenance of the DBDS 100 and is used for, among other things, trouble shooting the DBDS 100 after maintenance. Assume, for example, that during maintenance the communication links having network transport stream 252 and 250(E) were accidentally crossed wired such that MQAM 230(A) received the network transport stream 250(E) and MQAM 230(B) received the network transport stream 252, then the system would be thrown into confusion and chaos. In prior systems, the operator of the system might have to resort to a physical examination of all of the communication links that carry network transport streams to find the pair of crossed wires. However, in the present DBDS 100 system, the operator of the DBDS 100 could determine which wires were accidentally crossed by simply comparing the "master" map with a network transport stream map generated after the maintenance. Other uses for a network transport stream map, which is dynamic, are recognizable to those skilled in the art.

Typically, network devices do not know what devices are downstream or upstream from them. In yet another embodiment, the controller, either the network controller 234 or the sub-network controller 236, uses the network transport stream map 400 to provide network information to network transport stream sources and handlers. The network transport stream sources or network transport stream handlers can then use the information about their downstream devices to ensure that the transport stream provided to the downstream device is correct. In a non-limiting example, BIG 224 outputs a transport stream to an ASI-SONET transmitter (not shown), which has a lower bandwidth than the BIG. In which case, the BIG 224 matches its output to the output of the ASI-SONET transmitter to make certain that the ASI-SONET transmitter can handle the transport stream.

Transport Stream Handler

Figure 8:
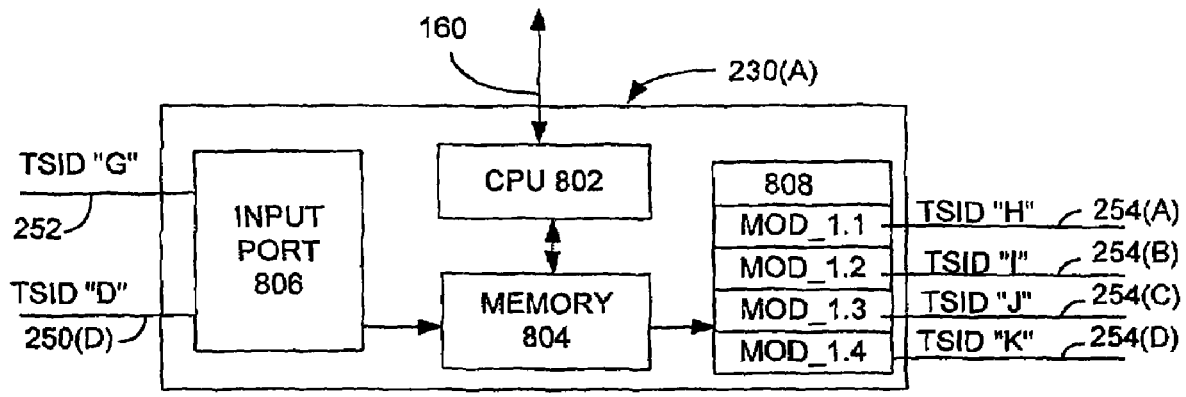
FIG. 8 is a block diagram of an exemplary transport stream handler in the broadband communication system.

As previously stated, a transport stream handler is a device that is adapted to receive at least one input network transport stream, output at least one network transport stream and adapted to map one TSID onto at least one of the output network transport streams. For exemplary purposes, the network transport stream handler MQAM 230 is shown in FIG. 8. Briefly described, the MQAM 230 includes an input port 806 that receives network transport streams, a central processing unit (CPU) 802 that communicates with external controllers and controls components of the MQAM 230 such as memory 804 and transmitters 808. The memory 804 includes storage for buffering MPEG packets 300 of the input network transport streams and for storing logic necessary for, among other things, implementing the various steps required for receiving/transmitting transport streams, mapping TSID values and responding to network messages. In an alternative embodiment, the memory 804 includes a FPGA that implements much of the necessary logic.

The transmitters 808 includes modulators such as QAM modulators that radio frequency modulate the output network transport streams. The transmitters receive the packets of the transport streams from the memory 804 and transmit the packets.

It should be noted that MQAM 230 is an exemplary network transport stream handler and that network transport stream sources and different network transport stream handlers may include different or more or fewer components. Furthermore, it is to be understood that the number of input and output transport streams depends upon the particular network transport stream source or handler. However, in the preferred embodiment, each network transport stream handler and network transport stream source includes a CPU 802 and a transmitter 808. The CPU 802 is in communication with the network controller 234 and/or the sub-network controller 236 through communication link 166, through which messages such as INTSM message and network messages 600 are transmitted.

Figure 9:
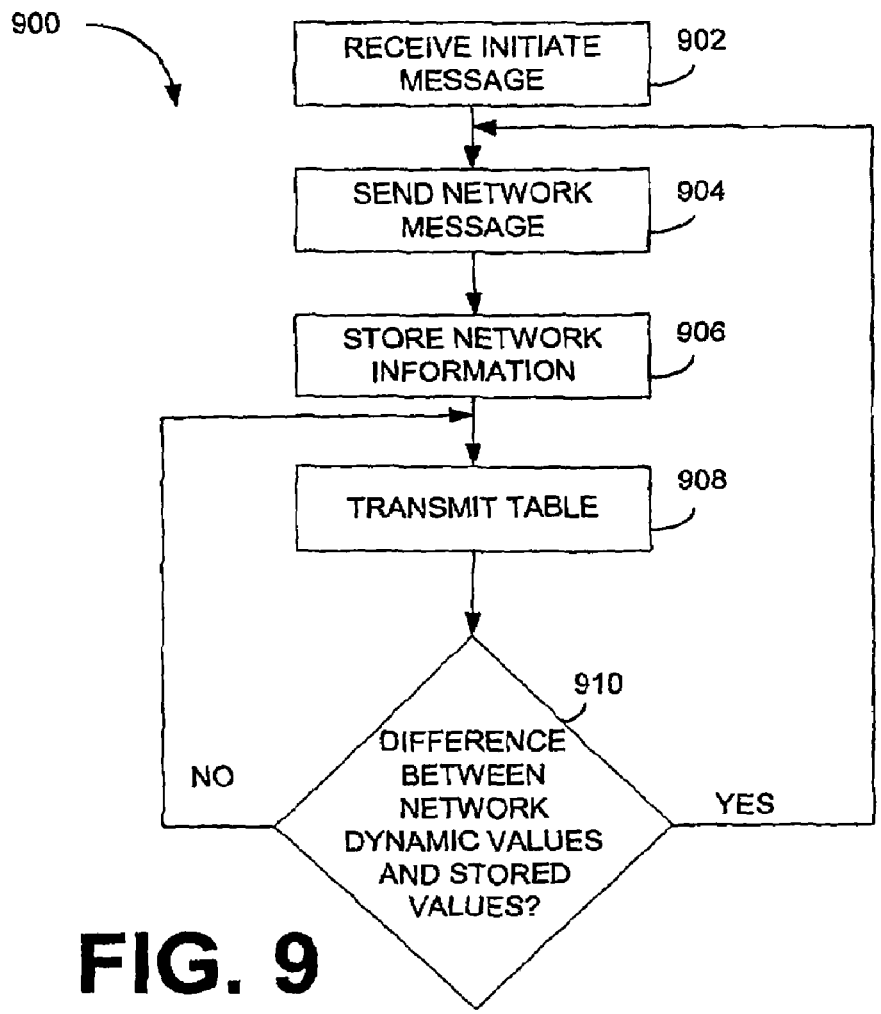
FIG. 9 is a flowchart of a method for dynamically providing information to a controller and downstream devices.

In response to a received INTSM message the CPU 802 responds by implementing steps 900 shown in FIG. 9. The CPU 802 and memory 804 include all of the logic necessary for implementing the steps 900. Included in the logic of MQAM 230(A) is the logic necessary for receiving a network transport stream, which is comprised of MPEG packets 300, and routing the received packets to their respective output network transport streams 254. Those skilled in the art will recognize that the logic of MQAM 230 also includes the logic for making system and control packets such as Program Association Tables (PATs) and Conditional Access Tables (CATs) for the output network transport streams and for remapping Packet Identifiers (PIDs) of the received packets. In addition, although the steps 900 are described as being implemented by CPU 802 of MQAM 230 it is to be understood that this is for exemplary purposes only, and that the CPU of any network transport stream handler or network transport stream source could be configured to implement steps 900. In yet another embodiment, the logic for implementing steps 900 is distributed between the controller that controls MQAM 230 and MQAM 230.

In step 902, CPU 802 receives through communication link 166 the INTSM message. The CPU determines the network status of input network transport stream 250 and 252 and output network transport stream 254. The network status includes information such as, but not limited to, the TSID value of each network transport stream, BER rate, available bandwidth in each of the output network transport streams 254, over allocation of bandwidth, lost link, and input good or input bad.

The memory 804 includes device information that identifies this device as being a given type of device and it also includes information identifying that it is a particular device of that device-type. For example, the device information could indicate that MQAM 230 is a MOD (modulator) type of device and that it is number three of the MOD type devices within the DBDS 100 and that it has four output network transport streams 254(A)-254(D).

In step 904, the CPU 802 sends a network message 600 to the controller through communication link 166. In the preferred embodiment, the CPU 802 sends a network message 600 for each modulator 808 that transmits a network transport stream 254; the device-type field 602 of the network message 600 includes an indicator of the modulator that the message is associated with; and the output TSID field 604 indicates the output TSID value of the output transport stream.

In step 906, the CPU 802 stores network information in memory 804. Generally the stored network information includes the type of network information that was included in the network message 600. Non-limiting examples of the type of network information stored in memory 804 includes the TSID value for each received network transport stream, BER for each input network transport stream 250 and 252, and available bandwidth for each of its output network transport streams 254.

In the preferred embodiment, the memory 804 includes logic for making a dynamic network information table (DNIT), which will be described in greater detail hereinbelow. A DNIT includes current network information similar to the network information included in network message 600. The CPU 802 makes a DNIT for each output network transport stream 254 and inserts each DNIT into its respective network transport stream 254. In the preferred embodiment, in step 908 the CPU 802 periodically includes a DNIT, with current network information included therein, in each of the output network transport stream 254. Thus, downstream devices periodically receive current network information from MQAM 230.

Then in step 910, the CPU 802 monitors each of the input network transport streams, 250 and 252, and determines that if there are differences between the stored network information and the current network information. Generally, the CPU 802 is monitoring the network for changes that cross a threshold as opposed to a slight change or variation. For example, the operator of the DBDS 100 might establish a BER threshold, and as long as both the stored BER value and the current BER value are both above or below the threshold, then the BER value is considered not to have changed. Other network information values have discrete changes. For example, a TSID value of a network transport stream remains constant unless the TSID value of the network transport stream is remapped to a new value. If the CPU 802 determines that a change has occurred in the monitored network transport stream, the CPU 802 reverts to step 904 and transmits a new network message 600 that includes the current network information to its controller, either the network controller 234 or the sub-network controller 236. On the other hand, if there is no change the CPU 802 continues to monitor the network transport streams and periodically transmit a DNIT.

In an embodiment, when the CPU 802 determines that a change in the monitored network values has occurred, the CPU 802 also includes new DNIT in each of the output network transport streams 254. The information contained in the new DNIT reflects the current network values. Even if the CPU 802 does not immediately transmit a new DNIT in response to a change in the monitored network values, the CPU 802 periodically transmits DNIT with current network information included therein. Thus, downstream devices will receive a DNIT that reflect the current network status of MQAM 230.

Dynamic Network Information Table

In an embodiment the DNIT is inserted into a system packet known to those skilled in the art. Non-limiting examples of system packets include, but are not limited to, a program association table (PAT) packet of an MPEG transport stream or a conditional access table (CAT) or a network information table (NIT). In an alternative embodiment, the operator of the DBDS 100 chooses a PID value that is not already reserved and reserves that PID value for the DNIT, which is then inserted into a packet having that particular reserved PID value.

In the preferred embodiment, each network transport stream source and network transport stream handler includes the necessary logic for making a DNIT. In addition, each network transport stream source and handler includes the necessary logic for retrieving a DNIT from a network transport stream, reading the retrieved DNIT, and inserting a DNIT into an output network transport stream.

Figure 10:
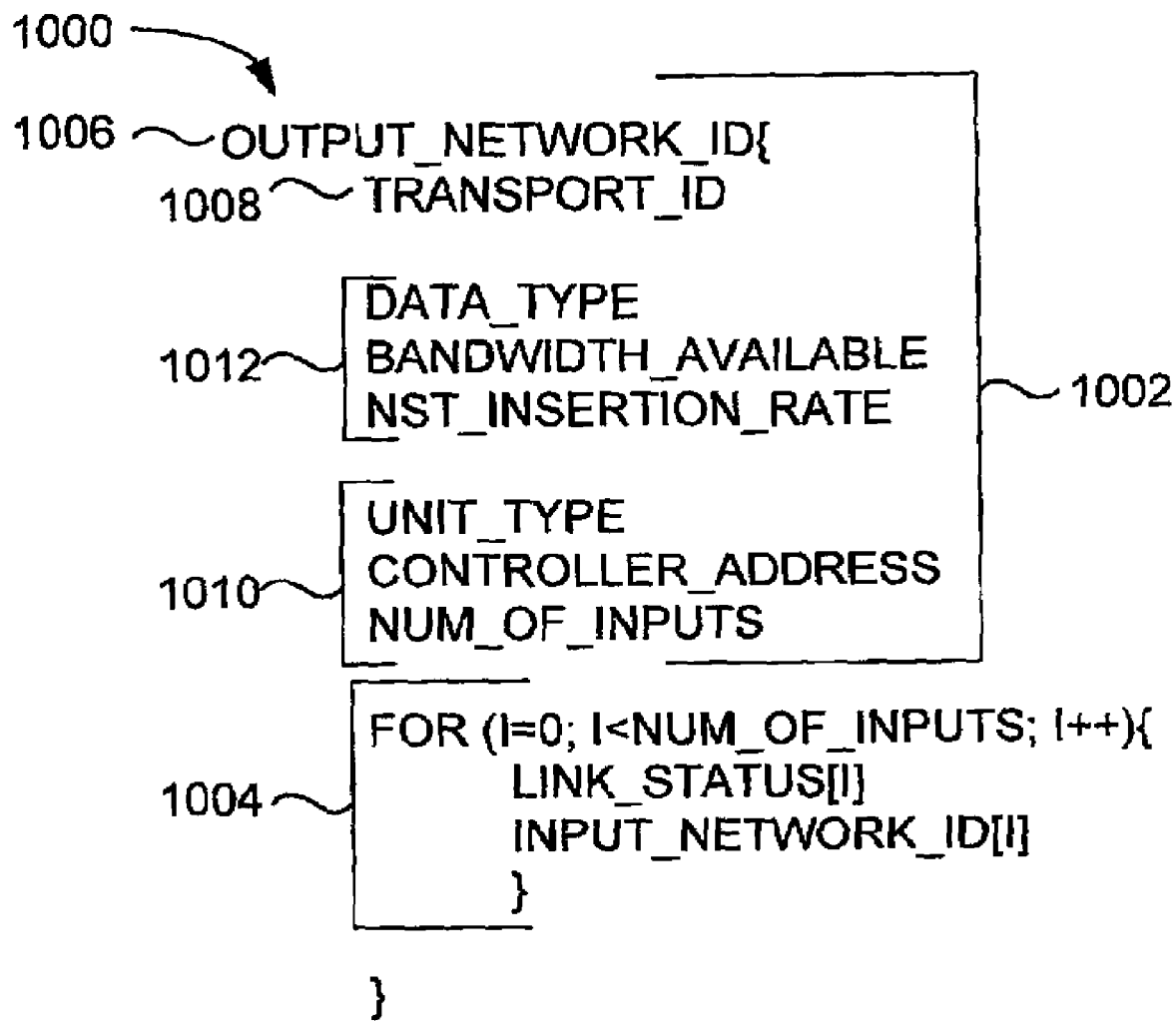
FIG. 10 is pseudo-code for making a dynamic network information table.

Referring now to FIG. 10, a processor of a network transport stream source or a network transport stream handler implements code such as DNIT pseudo-code 1000, for example, for making a DNIT. The code includes a device portion 1002 and a pre-device portion 1004.

The device portion 1002 is for generating information that is specific to the device. Generally, the device portion 1002 includes identification field 1006, a transport ID field 1008, and a device information field 1010 and network data field 1012.

The identification field 1006 identifies the device that executes the code for generating the DNIT. In an embodiment, the identification information included in identification field 1006 corresponds to the information included in the device identification field 602 of the network message 600. In another embodiment, the identification information included in identification field 1006 can be any information such as, but not limited to, the IP address of the device or the MAC address of the device, which can be used to identify the device.

The information included in the transport ID field 1008 corresponds to the TSID value of the network transport stream in which the DNIT is inserted. For example, referring to FIG. 4, when BIG 224 produces a DNIT, then the transport ID field 1008 has a value of "G" associated with it, because the BIG 224 inserts the DNIT into network transport stream 252, which has the TSID 402 of "G."

The device information field 1010 includes information about the device, which can include information such as the type of device making the DNIT, non-limiting examples of which include network transport stream source, satellite signal receiver, encoder, server, VOD server, BIG, modulator, multi-modulator and network transport stream handler. The device information field 1010 can also include device specific information such as the number of input network transport streams.

In the preferred embodiment, the device information field 1010 also includes the address of the controller that controls the device making the DNIT. For example, the network controller 234 controls the satellite signal receiver 214(A) and the sub-network controller controls the server 216(B). Thus, a DNIT from the satellite signal receiver 214(A) includes the controller address for the network controller 234, and a DNIT from server 216(B) includes the address of the sub-network controller 236.

The network data field 1012 includes information about the network transport stream in which the DNIT is inserted. Examples of information included in the network data field 1012 include, but are not limited to, the available bandwidth of the network transport stream, the types of packets in the transport streams, the insertion rate of the DNIT into the network transport stream and the bit error rate of the received packets. In addition, the network data field 1012 can include information about the type of packets, such as, data, audio, video, etc., included in the network transport stream.

The upstream portion 1004 of the DNIT pseudo-code 1000 includes the logic necessary for including information from upstream devices into the DNIT. In the preferred embodiment, the information from upstream devices is included in a DNIT received through a network transport stream. In an alternative embodiment, DNITs are propagated to downstream devices through other communications links such as, but not limited to, communication link 166 and out-of-band communication.

As previously stated hereinabove, in the preferred embodiment, each network transport stream source and each network transport stream handler outputs a DNIT in each of its output network transport streams. Thus, for example, MQAM 230, which has four-output network transport streams, outputs a DNIT for each output network transport stream and each DNIT includes upstream information. In the preferred embodiment, the DNIT includes upstream information from upstream devices. Referring now to FIG. 4, MQAM 230(A) receives two network transport streams 252 and 250(D) from BIG 224 and encoder 218, respectively. Thus, a DNIT from MQAM 230 will include upstream information from BIG 224 and encoder 218.

Figure 11:
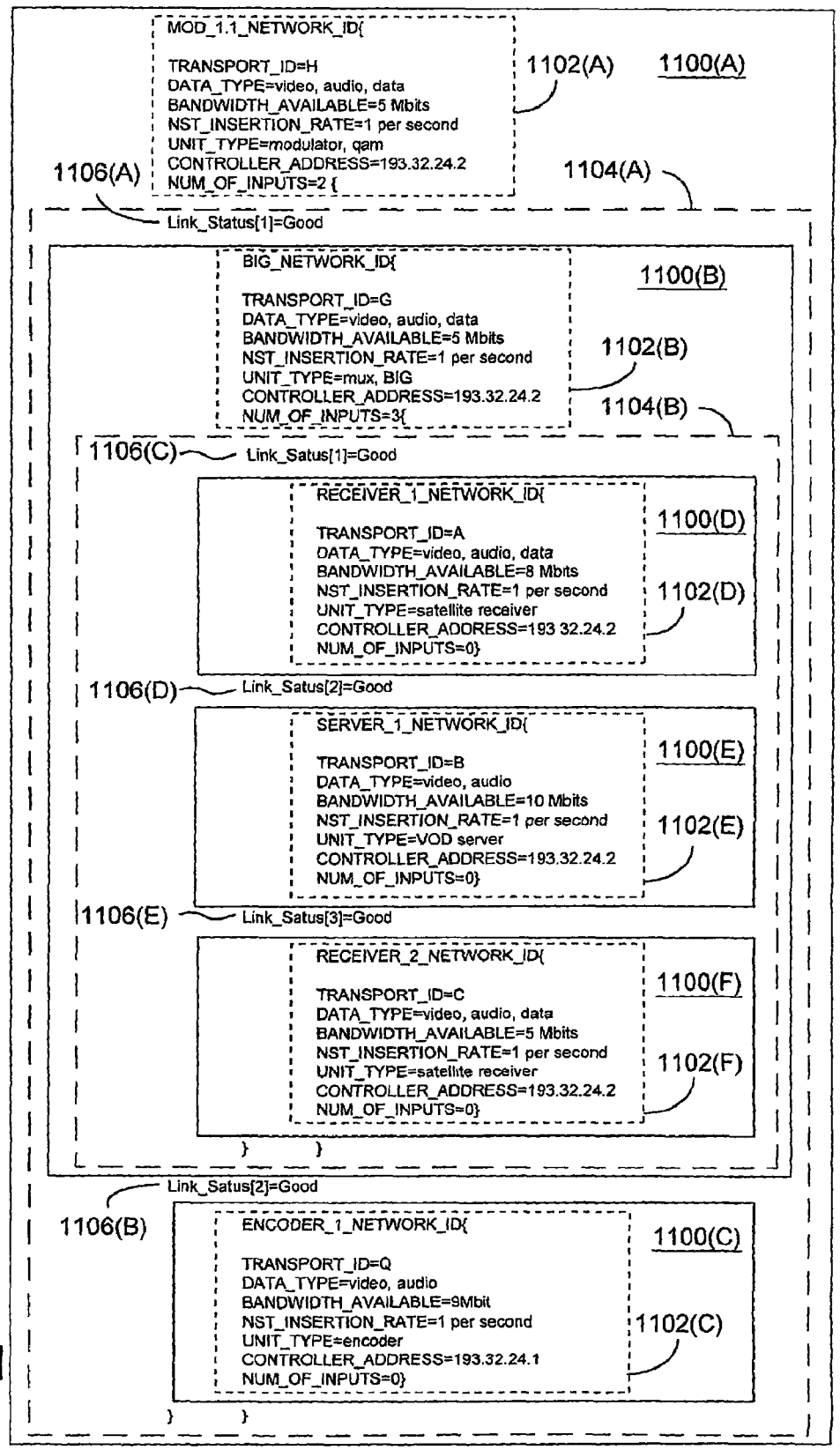
FIG. 11 is an exemplary nested dynamic network information table.

Referring to FIG. 11, exemplary DNIT 1100(A) is included in network transport stream 254(A), which is the output network transport stream from a MOD_1.1 of MQAM 230(A). The DNIT 1100(A) includes a device specific subtable 1102(A) and an upstream subtable 1104(A).

The device specific subtable 1102(A) includes information about the device, in which the DNIT 1100(A) originated, which in this example is MOD_1.1. The information included in the device specific subtable 1102(A) is from the device portion 1002 of DNIT pseudo-code 1000. The device specific subtable 1102(A) indicates that DNIT 1100(A) is included in transport stream H, which from transport stream map 400 is known to be transport stream 254(A), which came from MOD_1.1 of MQAM 230(A). The device specific information subtable 1102(H) also indicates that MOD_1.1 receives input of two transport streams.

The upstream subtable 1104(A) includes information received from upstream devices, such as, network transport stream sources and network transport stream handlers. The information from the upstream devices is provided to MQAM 230(A) through DNITs received through transport streams 250(D) and 252. The information from the upstream devices is included in upstream subtable 1104(A) by pre-device portion 1004 of DNIT pseudo-code 1000. In this exemplary DNIT 1100(A), the upstream subtable 1104(A) includes DNITs 1100(B) and 1100(C), which are from BIG 224 and encoder 218, respectively. The DNIT 1100(B) and 1100(C) each include device specific subtable 1102(B) and 1102(C), respectively, and DNIT 1100(B), which is from the intermediate tier level device BIG 224, includes DNITs 1100(D), 1100(E) and 1100(F), which are from satellite signal receiver 214(A), server 216 and satellite signal receiver 214(B), respectively. Thus, DNITs from upstream devices are embedded in DNIT 1100(A).

The exemplary DNIT 1100(A) also includes link status information 1106(A) and 1106(B) for each of its received network transport streams 252 and 250(D), respectively, which are currently "good." Exemplary DNIT 1100(B) from BIG 224 also includes the link status information 1106(C), 1106(D) and 1106(E), which are associated with network transport streams 250(A), 250(B) and 250(C), respectively, and which are also currently "good." If network transport stream 250(C) were to be broken, the BIG 224 would determine that the link status is now "bad," in which case the link status 1106(E) of the next DNIT 100(B) from BIG 224 would read "bad." This information, that the link status of network transport stream 250(C) is bad, is then propagated down stream and it is included in a network message transmitted to the network controller 234 or sub-network controller 236. The controller that receives the network message automatically responds to it by rerouting of the content the transport stream 250(C) or by alerting the operator of the DBDS 100.

It should be noted that DNIT 1100(A) is an embodiment of a table that is propagated downstream through a network transport stream. Those skilled in the art will recognize that more or less information can be included in the table.

It should also be noted that in an alternative embodiment, not all of the network transport stream sources are adapted to make and transmit a DNIT. However, when an upstream device fails to transmit a DNIT to a downstream device, the downstream device can still make a partial DNIT and propagate that DNIT downstream. For example, if encoder 218 does not transmit the DNIT 1100(C) to MQAM 230, as shown in FIG. 11, MQAM 230(A) can still make a partial DNIT. However, MQAM 230(A) can still determine: (1) the TSID 402 of network transport stream 250(D); (2) the link status 1106(B) for the network transport stream 250(D); and then include the TSID value and the link status in DNIT 1100(A) in lieu of the embedded DNIT 1100(C). In addition, MQAM 230(A) can send a message to the network controller 234 that indicates that MQAM 230(A) is receiving a network transport stream having a TSID value 402(D) of "D" but not receiving a DNIT in the transport stream 402(D)." The network controller can then consult the network transport stream map 400 and determine information about the device that is outputting the network transport stream having the TSID 402 with the value of D. In addition, the network controller 234 can request further information regarding the upstream device from the operator of the DBDS 100, and the operator can enter this information manually. The network controller 234 can then send this information to MQAM 230(A), which then includes that information in DNIT 1100(A). Thus, a network transport stream handler can at least partially fill in upstream information for a device that does not send a DNST by determining the TSID of the received network transport stream, communicating with the controller to request further information about the upstream device, and receiving information about the particular device from the network controller 234 and/or the sub-region controller 236.

A DHCT 110 is provided with upstream information through DNIT 1100 for each network transport stream that the DHCT 110 receives. For example, a DHCT 110 that is connected to combiner 232(C) receives the network transport streams 254(A)-254(C), which are from MQAM 230(A) located in the headend 102, and network transport streams 254(I) and 254(J), which are from MQAM 230(C) located in the hub 104. The DNITs 1100 included in the network transport streams 254(A)-254(C) include network information about the network transport streams 250(A)-250(D) and 252 and information regarding the following devices: satellite signal receivers 214(A) and 214(B), application server 216 (A), encoder 218, BIG 224 and MQAM 230(A); and the DNITs in network transport streams 254(I) and 254(J) include network information about network transport streams 250(G) and 250(H) and information regarding the following devices: application server 216(B), satellite signal receiver 214(C) and MQAM 230(C).

The DHCT 110 can use the received DNITs to alleviate some of the processing load placed upon the network controller 234 and/or the sub-network controller 236. In prior art subscriber television systems, a subscriber of the DBDS 100 can use the DHCT 110 to interactively order services such as, but not limited to, video-on-demand programming, pay-per-view programming, personal television, audio programming and internet connectivity. A subscriber's request for a service is transmitted from the DHCT 110 to a controller, either the network controller 234 or the sub-network controller 236, which then implements the necessary steps for providing the requested service. However, using the received DNIT 1100 the DHCT 110 can make an informed request for a service. For example, in a prior art system, when a user wished to start a pay-per-view service or program, such as receiving a movie stored in one or more VOD servers of DBDS 100, the user sent a request to the network controller via the user's DHCT 110 for the service. The network controller 234 or sub-region controller 236 had to determine: which of the VOD servers of DBDS 100 were upstream from the requesting DHCT 110; which of the upstream VOD servers had the requested service; and which one of those servers should transmit the requested service. However, in accordance with one embodiment of the invention, the DHCT 110 can now consult received DNITs 1100 and determine a list of servers that are upstream from the DHCT 110 and determine the controller for each of the servers in the list. For example, a DHCT 110, which receives network transport streams from combiner 232 (C), is down stream from application servers 216(A) and 216(B). The DHCT 110 can then transmit the list of servers to the network controller 234 or the sub-region controller 236 with the request for the service.

In one embodiment, the processing of service requests from the DHCT 110 is distributed between the network controller 234 and the sub-region controller 236. Providing the list of servers to the network controller 234 or the sub-region controller 236 alleviates some of the processing load placed upon the network controller 234 and/or the sub-region controller 236; the network controller 234 and/or the sub-region controller 236 no longer needs to determine which servers are upstream from the DHCT 110. In addition, the request for the service can also include the current dynamic network status of each of the network transport streams between each of the servers and the DHCT 110. Thus, the network controller 234 and/or the sub-region controller 236 can immediately determine which of the network transport streams being received by the DHCT 110 has the necessary bandwidth for the requested service.

In an alternative embodiment, the DHCT 110 using the DNIT 1100 can make many of the necessary decisions for initiating the transmission of a service offered by DBDS 100. For example, the DHCT 110 can consult programming tables that are transmitted out-of-band to the DHCT 110. A programming table includes information such as listing the pay-per-view programming stored in a given server. When a subscriber of DBDS 100 selects a particular program, the DHCT 110 uses the received DNIT 1100 and the received programming tables to determine which of the servers that are upstream from the DHCT 110 have the particular program stored therein. The DHCT 110 can also determine from the received DNIT which network transport stream has the necessary bandwidth for carrying a requested service, such as, but not limited to, a pay-per-view program, a video-on-demand program and an internet connection. The DHCT 110 can then send a message to a specific server requesting the service. The transmission path from the server to the DHCT 110 is determined by the DHCT 110 from the information contained in the received DNIT 1100. The DHCT 110 will choose a transmission path in which all of the links of the path are good, as specified in the DNIT 1100, and in which all of the links have available bandwidth. Thus, by providing the DHCT 110 with dynamic network information such as the available bandwidth in the network transport streams and the link status, the processing load placed upon either the network controller 234 or the sub-network controller 236 can be shifted to the DHCT 1110. Except for receiving a message indicating that a DHCT 1110 should be billed for a service, the controller, either the network controller 234 or the sub-network controller 236, need not necessarily be involved in providing the service to a user. The billing message can come from the DHCT 110 or from the device in the network that sends the service, such as a server, or some other device that monitors the usage of DBDS 100 by the DHCT 1110. In an alternative embodiment, the transmission path for a requested service is still determined by the controller, either the network controller 234 or the sub-region controller 236. In some situations, the controller may decide not to send a service to the DHCT 110 along the transmission path determined by the DHCT 110. The controller might want or need to reserve some of the bandwidth of the transmission path chosen by the DHCT 110 for other purposes; in which case, the controller determines a different transmission path to the DHCT 110.

In addition, the DHCT 110 and network transport stream handlers can use the received DNITs to monitor the DBDS 100. In the preferred embodiment, the DNIT 1100 includes an insertion rate in the device specific subtable 1102, which corresponds to a heart beat. In the preferred embodiment, each network transport stream handler on DHCT 110 includes enough memory for storing at least the controller address and the DNIT insertion rate associated with each of its input network transport streams. Devices such as network transport stream handlers and DHCTs 110 use the DNIT insertion rate to monitor input network transport streams. For example, MQAM 230(A) receives a DNIT 1100(B) from BIG 224 once every second. If MQAM 230(A) does not receive a DNIT 1100(B) within a predetermined time, such as two seconds, from the time that the last DNIT 1100(B) was received, then MQAM 230(A) sends an alert to the controller (network controller 234) of the BIG 224. The network controller 234 then sends an alert to the operator of the DBDS 100 that there is some sort of communication break between the BIG 224 and the MQAM 230(A).

In an alternative embodiment, the DHCT 110 includes information about itself and its received network transport streams in the DNIT 1100 and sends the DNIT 1100 to the headend 102 or hub 104. Thus, the DNIT 1100 extends from network transport stream sources to the DHCT 110. In which case, the network controller 234 or sub-network controller 236 uses the DNIT 1100 to determine network conditions from network transport stream sources to the DHCT 110. The network controller 234 or sub-network controller 236 can also use the DNIT 1100 to map individual DHCTs 110 within the DBDS 100.

In yet another embodiment, the controller, either the network controller 234 or sub-network controller 236, uses the DNITs received from DHCTs 110 to monitor the two-way communication path between the DHCTs 110 and the headend 102 or hub 104. The controller selects one or more DHCTs 110 in a given geographical region of the DBDS 110, such as a sub-distribution network 160, to periodically send DNITs 1100 to the headend 102 or hub 104. The DNITs 1100 from each geographical region then act as a heartbeat for the two-way communication between that geographic region and the headend 102 or hub 104. The controller can determine the current status of the two-way communication, such as the QPSK modem array, by the heartbeat, and specifically, whether communication from a DHCTs 110 in a given geographic region has been severed or lost.

Typically, network devices do not know what devices are downstream or upstream from them. In yet another embodiment, the controller, either the network controller 234 or the sub-network controller 236, receives the DNITs 1100 from the DHCTs 110 in the DBDS 100 and uses them to provide network information to network transport stream sources and handlers. The network transport stream sources or network transport stream handlers can then use the information about their downstream devices to ensure that the transport stream provided to the downstream device is correct. In a non-limiting example, BIG 224 outputs a transport stream to an ASI-SONET transmitter (not shown), which has a lower bandwidth than the BIG. In which case, the BIG 224 matches its output to the output of the ASI-SONET transmitter to make certain that the ASI-SONET transmitter can handle the transport stream.

Figure 12:
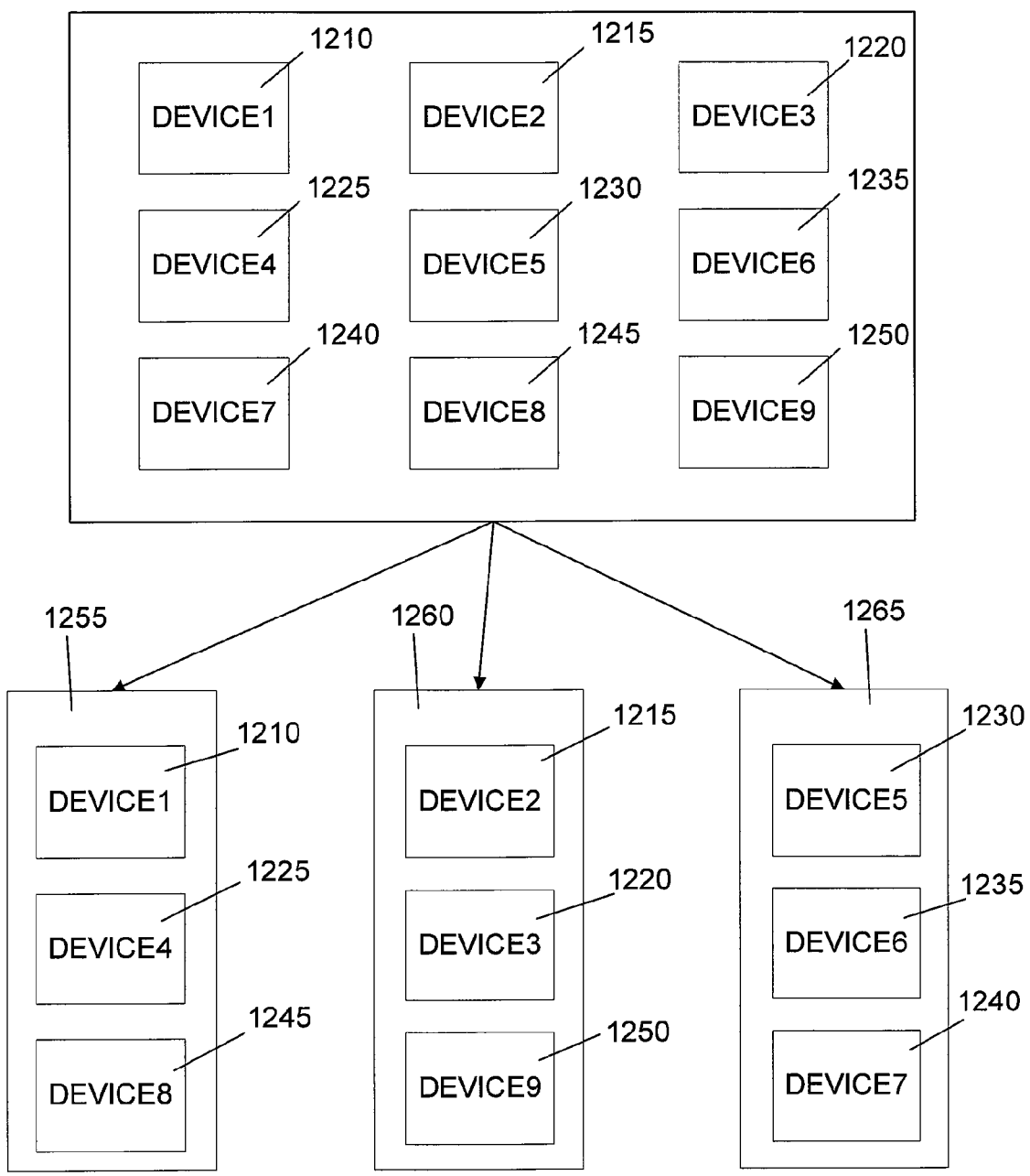
FIG. 12 is a flow diagram of an exemplary embodiment of grouping multiple devices of the plurality of devices into a plurality of tiers within a digital network.

Referring to FIG. 12, devices 1210, 1215, 1220, 1225, 1230, 1235, 1240, 1245, and 1250 are grouped into tiers 1255, 1260, and 1265.

Figure 13:
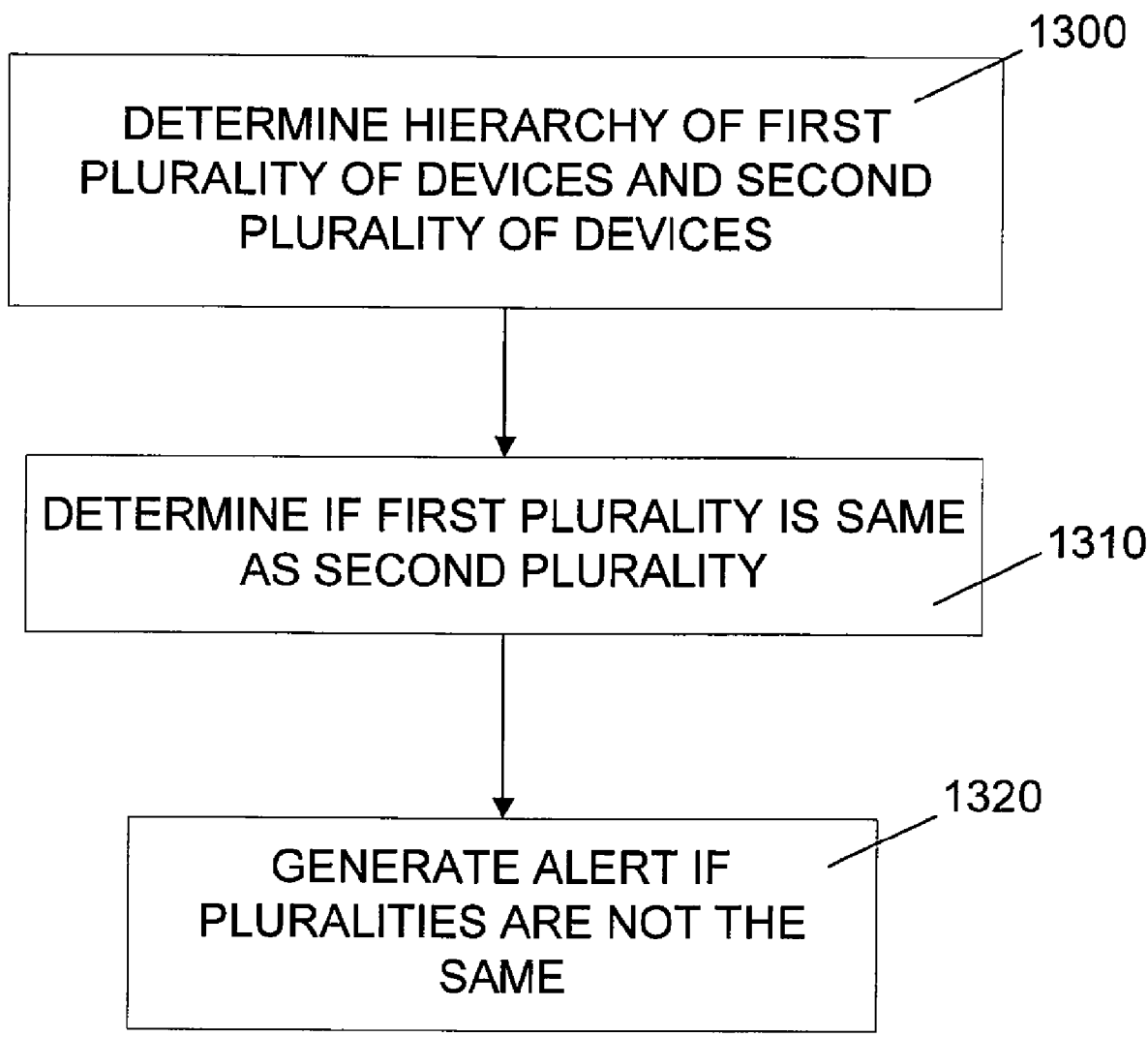
FIG. 13 is a flow diagram of an exemplary embodiment of generating an alert after determining that a first plurality of devices is not the same as the second plurality of devices.

Referring to FIG. 13, in block 1310, a hierarchy of first plurality of devices and second plurality of devices is determined. In block 1320, a determination is made as to whether the first plurality of devices is the same as the second plurality of devices. In block 1330, an alert is generated if the first plurality of devices is not the same as the second plurality of devices.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method for mapping a digital network, comprising:
    sending a transport stream map request to a plurality of network devices including a plurality of network transport stream sources and a plurality of network transport stream handlers;
    receiving a plurality of replies to the transport stream map request from the plurality of network devices, each reply including information associated with the respective network device, the information including an input transport stream identifier (input TSID) received by the respective network device and an output transport stream identifier (output TSID) transmitted by the respective device;
    remapping, when a received at least one of: the input TSID and the output TSID indicates a transport stream transmission conflict, a corresponding at least one of:

an input transport stream corresponding to at least one network transport stream handler associated with the conflict, and an output transport stream corresponding to one of: the at least one network transport stream handler and at least one network transport stream source associated with the conflict; and generating a transport stream map based on at least one of: the received replies and at least one remapped transport stream identifier, the transport stream map representing a flow of transport streams among the plurality of network devices.

2. The method of claim 1, further comprising:
reading a device type in each of the replies; and
sorting the replies into groups, based on the device type corresponding to at least one of the following: a source tier device, an intermediate tier device, and an output tier device.

3. The method of claim 2, further comprising:
storing each device type as an entry in the transport stream map.

4. The method of claim 1, further comprising:
reading the output transport identifier (TSID) in each reply.

5. The method of claim 4, further comprising:
determining a conflict based on whether two or more of the transport streams from the network devices have the same output TSID.

6. The method of claim 1, further comprising:
updating the transport stream map.

7. The method of claim 6, wherein updating the transport stream map comprises:
for each reply having a device type that indicates a network transport stream source, associating an entry in the transport stream map, having a matching device type, with the output TSID in the reply.

8. The method of claim 6, wherein updating the transport stream map comprises:
for each reply having a device type that indicates an intermediate tier device, associating an entry in the transport stream map, having a matching device type, with the input TSID and the output TSID in the reply.

9. The method of claim 6, wherein updating the transport stream map comprises:
for each reply having a device type that indicates an output tier device, associating an entry in the transport stream map having a matching device type with the input TSID and the output TSID.

10. The method of claim 1, further comprising:
sending a TSID remap message.

11. The method of claim 10, wherein sending the TSID remap message comprises:
sending the TSID remap message to the at least one network transport stream source associated with the transport stream transmission conflict, the remap message instructing the at least one network transport stream source to remap a corresponding output TSID of the at least one network transport stream source to a new output TSID.

12. The method of claim 10, wherein sending the TSID remap message comprises:
sending the TSID remap message to the at least one network transport stream handler associated with the transport stream transmission conflict, wherein the at least one network transport stream handler is an intermediate tier device.

13. The method of claim 10, wherein sending the TSID remap message to the at least one transport stream handler comprising sending the remap message instructing the at least one transport stream handler to remap its output TSID to a newly assigned TSID.

14. The method of claim 1, further comprising:
identifying a network device having an input TSID that does not match any output TSID, the network device being a non-responsive transport stream; and
sending an alert that the transport stream map is incomplete.

15. The method of claim 1, wherein receiving the plurality of replies to the transport stream map request comprises receiving a network status of the respective network device.

16. A system for mapping a digital network, the system comprising:
a memory storage; and
a hardware processing unit coupled to the memory storage, wherein the hardware processing unit is configured to perform the following steps:
send a transport stream map request to a plurality of network devices including a plurality of network transport stream sources and a plurality of network transport stream handlers;
receive a plurality of replies to the transport stream map request, each reply including information associated with the respective network device, the information including an input transport stream identifier (input TSID) received by the respective network device and an output transport stream identifier (output TSID) transmitted by the respective device;
remap, when a received at least one of: the input TSID and the output TSID indicates a transport stream transmission conflict, a corresponding at least one of:
an input transport stream corresponding to at least one network transport stream handler associated with the conflict, and
an output transport stream corresponding to one of: the at least one network transport stream handler and at least one network transport stream source associated with the conflict and
generate a transport stream map based on at least one of: the received replies and at least one remapped transmission stream identifier, the transport stream map representing a flow of transport streams among the plurality of network devices.

17. The system of claim 16, wherein each of the replies includes a network device identifier, which is associated with a network device that transmits the reply.

18. The system of claim 16, wherein the input TSID is associated with the input transport stream received and monitored by the respective network device and wherein the output TSID is associated with the output transport stream received and monitored by the respective network device.

19. The system of claim 16, wherein each of the replies includes network information related to at least one characteristic of the digital network.

20. The system of claim 16, wherein the hardware processing unit is further configured to perform the following steps:
read a device type in each of the replies;
store each device type as an entry in the transport stream map; and
sort the replies into groups, based on the device type corresponding to at least one of the following: a source tier device, an intermediate tier device, and an output tier device.

* * * * *